United States Patent [19]
Oku et al.

[11] Patent Number: 5,636,316
[45] Date of Patent: Jun. 3, 1997

[54] PICTURE SIGNAL DIGITAL PROCESSING UNIT

[75] Inventors: Masuo Oku, Kamakura; Yukio Fujii; Masaru Takahashi, both of Yokohama; Kenji Ichige, Chigasaki; Keizo Nishimura, Yokosuka; Atsuo Suga, Kamagaya; Shigemitsu Higuchi, Fujisawa; Tomohide Sorihashi, Yokohama, all of Japan

[73] Assignee: Hitachi, Ltd., Tokyo, Japan

[21] Appl. No.: 283,685

[22] Filed: Aug. 1, 1994

Related U.S. Application Data

[63] Continuation of Ser. No. 802,734, Dec. 5, 1991, abandoned.

[30] Foreign Application Priority Data

| Dec. 5, 1990 | [JP] | Japan | 2-400453 |
| Dec. 19, 1990 | [JP] | Japan | 2-403744 |
| Apr. 12, 1991 | [JP] | Japan | 3-079619 |

[51] Int. Cl.$^6$ .................... H04N 5/92
[52] U.S. Cl. .................... 386/112; 386/116
[58] Field of Search .................... 358/335, 310, 358/339, 336, 432, 433; 360/32, 38.1, 48; 348/403, 423, 404, 405; 386/46, 112, 116, 124, 123, 114; H04N 5/92

[56] References Cited

U.S. PATENT DOCUMENTS

| 4,882,732 | 11/1989 | Kaminaga | 360/38.1 |
| 4,939,583 | 7/1990 | Tsuboi et al. | 348/405 |
| 4,984,607 | 1/1991 | Watanabe et al. | 348/405 |
| 5,045,925 | 9/1991 | Saito | 348/403 |
| 5,060,077 | 10/1991 | Koya et al. | 358/312 |
| 5,111,294 | 5/1992 | Asai et al. | 348/415 |
| 5,144,424 | 9/1992 | Savatier | 348/405 |
| 5,146,326 | 9/1992 | Hasegawa | 348/415 |

OTHER PUBLICATIONS

An Experimental Study for a Home–Use Digital VTR IEEE Transactions on Consumer Electronics, vol. 35, No. 3 Aug. 1989.

*Primary Examiner*—Thai Tran
*Assistant Examiner*—Huy Nguyen
*Attorney, Agent, or Firm*—Antonelli, Terry, Stout & Kraus, LLP

[57] ABSTRACT

A digital processing unit for converting a digital picture signal into data by blocks and for correction encoding a variable-length encoded signal. This digital processing unit includes a digital data compressing section for dividing a picture signal into a plurality of number of blocks, and compressingly outputting digital data of this picture signal based on a processing unit of one or a few blocks, a buffer section for sequentially storing the digital data, and an error correction encoding section for sequentially reading the digital data from this buffer section, and structuring an inner code for each inner block structured by this digital data and structuring an outer code for each predetermined unit of inner blocks, to thereby structure two-dimensional error correction code blocks, to output an error correction code signal. Further, the error correction encoding section has the length of the digital data of the picture signal included in the inner code set to be equal to or larger than a mean code length of predetermined compressed blocks.

9 Claims, 16 Drawing Sheets

F I G. 15
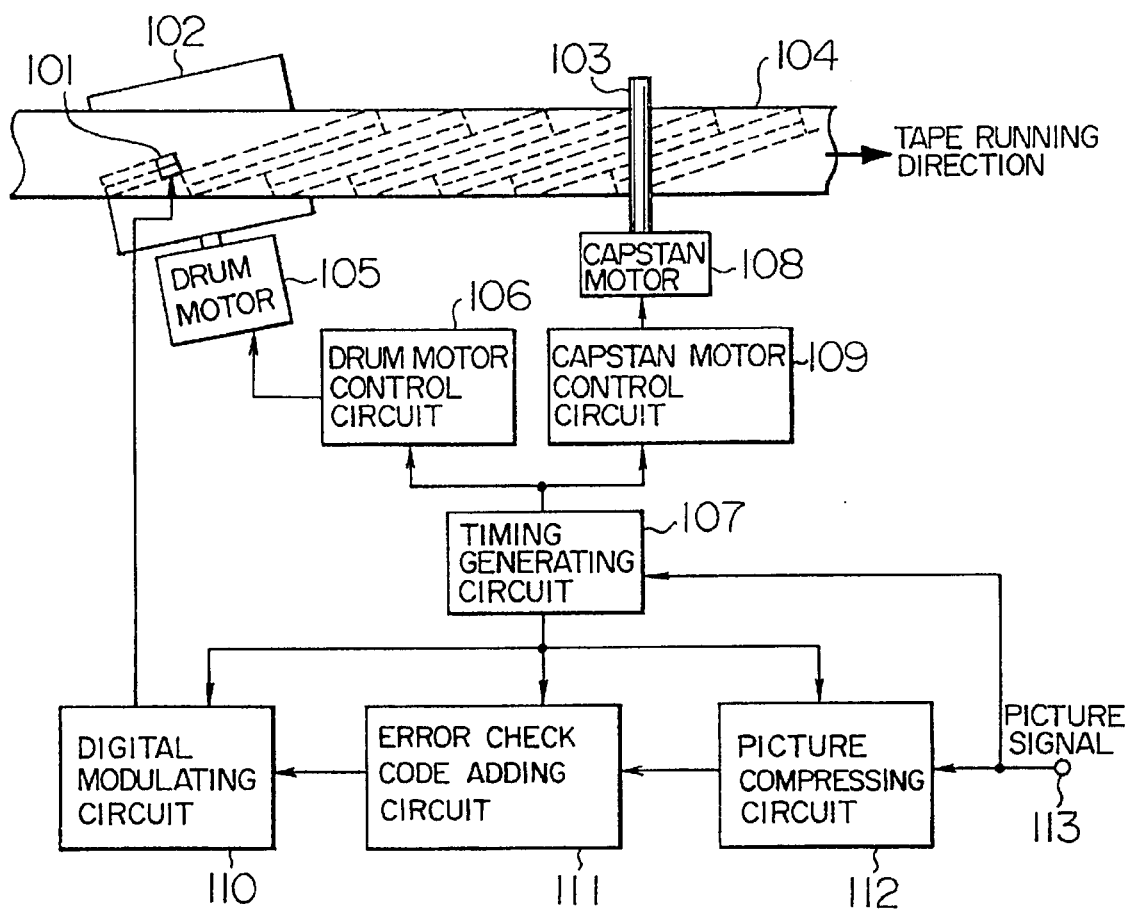

PICTURE SIGNAL DIGITAL PROCESSING UNIT

This Application is a Continuation of U.S. Ser. No. 07/802,734, filed Dec. 5, 1991 abandoned.

BACKGROUND OF THE INVENTION

The present invention relates to a digital picture data processing unit suitable for recording digital picture data by compressingly encoding the data using a recording unit such as a VTR or the like, and for reproducing digital picture data which is a result of decoding the recorded data and expandingly processing this data.

A conventional method for recording and reproducing picture data by compressingly encoding digital picture data and by decoding and expandingly processing the data is described in the IEEE Transaction on Consumer Electronics, Vol. 35 (1989), No. 3, pp. 450–456. A general method for compressing picture data is to carry out as a serial processing each of data conversion, quantization and variable length encoding (this is also called an entropy encoding) for input picture data. According to this method, the degree of data compression can be changed by changing the condition for quantization. The above prior art example is also based on this method. Data conversion according to this prior art example is a DCT transformation (discrete cosine transformation) which is a kind of an orthogonal transformation for carrying out a two-dimensional DCT transformation of each block of data, one block including picture data of eight pixels (length) times eight pixels (width). A result of this data conversion is observed as picture data within a block on a frequency axis. Quantization is carried out for each frequency component by considering visual characteristics. A data quantity after a variable-length encoding is measured by a data quantity measuring unit, and quantization is carried out by selecting quantization conditions based on the result of measuring, so that the data quantity per one block after the variable-length encoding is restricted to below a predetermined size. An ID and an internal code parity are added to each block to form a synchronous block having a predetermined size. An external code parity is added to a group of a predetermined number of synchronous block to form one error correction code block. A series of synchronous blocks including two error correction parities are digitally modulated and are recorded on a magnetic tape. According to this method, error detections and corrections can be carried out by internal code parities and external code parities. Even if an error which can not be corrected has occurred, an error propagation range can be restricted to within one synchronous block.

According to the prior art technique, however, an encoding distortion is concentrated on blocks of high entropy (minimum quantity of information required for encoding) under a state where a high compression ratio is required because each block is restricted to have the same code length regardless of the size of entropy of each block. Therefore, an excess quantity of data is allocated to blocks of low entropy, resulting in an inefficiency. Accordingly, it is necessary to carry out encoding based on an encoding system which provides a variable length for data generated in each conversion block and which carries out an efficient distribution of data quantity among blocks within a field. An error correction code needs to be structured and recorded in such an encoding system as described above.

When the code length for each block is made variable, a starting point of each data conversion block within an error correction code block is not made consistent if variable-length codes are merely stored in series within the error correction code block and an error correction parity is added to this as has been done conventionally. Particularly, this becomes a problem in a high-speed reproduction mode where a picture must be restored by picking up only one portion on one track by crossing tracks on a tape in which picture data has been recorded to find a heading point of the picture. In order to obtain a picture having a content which can be understood, at least codes of a DC component and a low-frequency component need to be reproduced. However, no proposal has yet been made for effectively recording a code of low-frequency component including a DC component by considering a high-speed reproduction mode.

SUMMARY OF THE INVENTION

It is an object of the present invention to provide a digital picture signal processing unit which eliminates the above-described problems of the prior-art technique and enables a satisfactory reproduction of picture data in a high-speed reproduction mode when the picture data is to be recorded and reproduced by compressingly encoding the data and by decoding the data through expansion.

In order to achieve the above object, the digital picture signal processing unit includes a unit for dividing a picture signal into blocks, a compression unit for compressing digital data of the picture signal, and an adding unit for adding an error correction code of a product code structure to the compressed digital data. Of the error correction code of the product code structure, the length of an area for storing the compressed data and header information, such as a data conversion block address of an error correction code to be decoded first (hereinafter to be referred to as an inner error correction code), is set to be longer than an average length of code in a conversion block unit of the compressed picture data. Further, of the components of the picture data divided into blocks by orthogonally converting the data, a DC component or a low-frequency component including DC is encoded in a fixed length, a high-frequency component is variable-length encoded, and the fixed-length codes and the variable-length codes are disposed by dividing the areas within the inner error correction code. The area for storing the variable-length codes is further divided into two, of which one area corresponds to the conversion block for picture data.

As described above, according to the high-speed reproduction mode, only a part of the error correction code of the product code structure, or at most one or a few inner error correction codes, are picked up by crossing the signal tracks at a high speed. Accordingly, a decoding based on the error correction code is limited to a range in which the decoding can be done by only an inner error correction code (hereinafter to be also referred to as an inner ECC block) instead of a two-dimensional decoding by a product structure, so that the decoding is completed with only a small amount of data that can be picked up.

According to the present invention, it is possible to provide an arrangement in which the probability becomes high that a part or the whole of the meaningful data in a divided block is included in one inner code and that a low-frequency component having a high proportion of contribution to the restoration of a picture among the data obtained by the orthogonal conversion is included in almost the whole of the inner code. Further, data of a higher frequency component can be utilized effectively. As a result, the picture can be restored efficiently from the data which is picked up in the high-speed reproduction mode.

BRIEF DESCRIPTION OF THE DRAWINGS

FIG. 15 is a configuration diagram of a digital VTR recording unit utilizing the configuration of the compression encoding system according to the present invention;

DESCRIPTION OF THE PREFERRED EMBODIMENTS

Embodiments of the present invention will be explained below with reference to the drawings.

Figure 1:
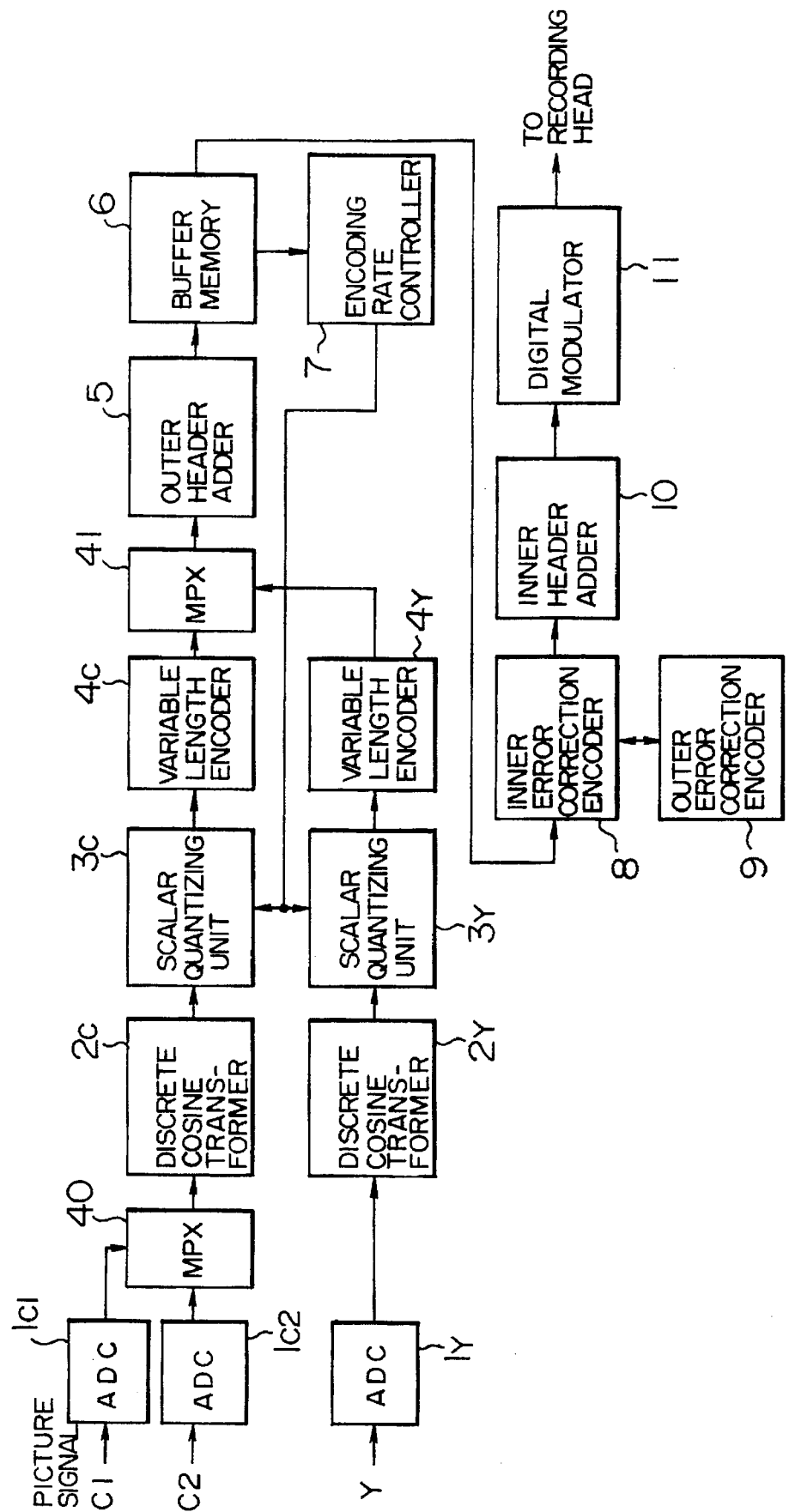
FIGS. 1 and 2 are block structure diagrams for a compression encoding system and a decoding expanding system according to an embodiment of the present invention, respectively.

FIG. 1 is a block diagram for showing the configuration of the data compression encoding system of the digital picture data processing unit according to the present invention. Referring to FIG. 1, $1c_1$, $1c_2$ and $1y$ denote analog-to-digital converters (ADC); 40 designates a multiplexer (MPX) for time-division multiplexing output digital data of $1c_1$ and $1c_2$; $2c$ and $2y$ denote discrete cosine transformer; $3c$ and $3y$ denote scalar quantizing units; $4c$ and $4y$ denote variable-length encoders; 41 denotes a multiplexer (MPX) for time-division multiplexing outputs from $4c$ and $4y$; 5 denotes an outer header adder; 6 denotes a buffer memory; 7 denotes an encoding rate control unit; 8 denotes an inner error correction encoder; 9 denotes an outer error correction encoder; 10 denotes an inner header adder; and 11 denotes a digital modulator. An output of the digital modulator 11 is supplied to a recording head of a recording unit, such as a VTR, for example.

A picture signal to be processed is inputted in the form of base band signals of a luminance signal (Y) and two color differential signals ($C_1$, $C_2$) to independently corresponding analog-to-digital converters $1y$ and $1c_1$ and $1c_2$ respectively, as shown in FIG. 1, to facilitate data compression. Each signal component is sampled in a sufficiently high frequency for the image signal and is quantized in a step width to sufficiently minimize any quantization distortion, to thereby digitalize the image signal (hereinafter to be referred to as picture data). The picture data includes a large amount of data. As a first step of data compression, outputs from the orthogonal converters $1c_1$ and $1c_2$ are time-division multiplexed by the multiplexer 40 and are then applied to the discrete cosine transformer $2c$, and an output from the orthogonal converter $1y$ is singly inputted to the discrete cosine transformer $2y$. A distortion of a color differential signal is difficult to be visually detected, as compared with a luminance signal, even if data quantity per signal is about a half. Therefore, as shown in FIG. 1, the multiplexer 40 is used to time dividingly process the two color differential signals and to share the data compression process in the discrete cosine transformer $2c$ in the processing of the color differential signals.

Figure 3:
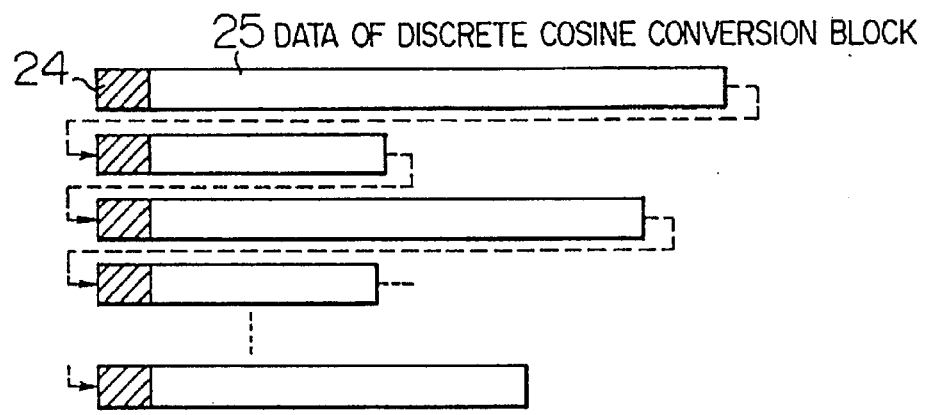
FIG. 3 is a diagram for showing the state of variable-length data which is a result of discrete cosine transformation in the present embodiment.

The data compression process includes the discrete cosine transformers $2c$ and $2y$, the scalar quantizing units $3c$ and $3y$, the variable-length encoders $4c$ and $4y$, the multiplexer 41, the outer header adder 5, the buffer memory 6 and the encoding rate control unit 7. The discrete cosine transformers $2c$ and $2y$ orthogonally convert a two-dimensional small block of the picture data (for example, eight pixels times eight scanning lines) by using a cosine function, to thereby concentrate the power of the image signal to the component of lower degrees of a two-dimensional frequency. The scalar quantizing units $3c$ and $3y$ requantize, in relatively small steps, the component of lower degrees, having a concentration of power, of the output data from the discrete cosine transformers $2c$ and $2y$, and requantize, in rough steps, the component of higher degrees, having a small concentration of power, of the output data from the discrete cosine transformers $2c$ and $2y$. The variable-length encoders $4c$ and $4y$ carry out Huffman encoding, for example, for the output data from the scalar quantizing units $3c$ and $3y$, in the sequence of degrees of a two-dimensional frequency, as continuous numbers for a component of zero value or numerical values of a non-zero component. As described above, components of higher degrees are rough quantized in the scalar quantizing units $3c$ and $3y$ so that the occurrence frequency of a zero component is high. As a result, data compression can be done effectively. Outputs from the variable-length encoders $4c$ and $4y$ are applied to the multiplexer 41 and the two variable-length codes are time-division multiplexed. As shown in FIG. 3, the lengths of picture data 25 which are the result of compressing the outputs from the variable-length encoders $4c$ and $4y$ are different for one or a plurality of blocks of discrete cosine transformation. As shown in FIG. 3, after the multiplex processing by the multiplexer 41, the outer header adder 5 adds a header 24 such as a synchronization signal or an identification (ID) signal (to be shown as an outer header to discriminate this header from a header to be added by the error correction encoding process to be described later) for showing the separation of one or a plurality of blocks of discrete cosine transformation.

Then, the compressed data is supplied to the error correction encoding process of the next stage through the buffer memory 6. The buffer memory 6 smooths the rate of generating compressed data. The variable-length encoded data have different data lengths between one and a plurality of blocks of discrete cosine transformation. However, the encoding rate control unit 7 always monitors the generated quantity of data in the unit period of one to a few frames/ fields of an image signal, and controls the width of the quantization steps by the scalar quantizing units $3c$ and $3y$ so that the variable length encoded data does not exceed a predetermined data quantity determined by the recording capacity of the recording unit per unit time. Although not shown, though a continuous error occurs at a certain position of the tape in the tape running direction, caused by defects such as scratches on the tape, it is also effective to include a shuffling processing by, for example, pseudo-randomizing the layout of conversion blocks in the above-described data compression process to thereby avoid concentration of a large error of the recording unit in a part of the image, and to decentralize the errors so as not to appear in the same part of the reproduced image.

The error correction encoding process includes the inner error correction encoder 8, the outer error correction encoder 9 and the inner header adder 10. FIGS. 4, 8, 11A and 11B show the structures of an error correction code, of which a detailed description will be made later. The error correction code has a product structure of M words in the lateral direction and L words in the vertical direction in the drawing. (When the error correction code is a code on a Galois field G (256), for example, one word includes eight bits and a variable-length code is divided at every eight bits.) Thus, the picture data includes one or a plurality of error correction codes and one frame/field or a few frames/field of picture signals. The compressed picture data having the format shown in FIG. 3, supplied from the buffer memory 6, is sequentially arranged in the lateral direction of a product structure in a data area 28 of M x L words shown in FIG. 4. Then, the inner error correction encoder 8 adds an inner check code 30 and the outer error correction encoder 9 adds an outer check code 29. The inner header adder 10 adds a synchronization signal $26a$ and an ID signal $26b$ as an inner header 26 so that the structure of the error correction codes can be restored in the digital picture data decoding expanding circuit to be described later. The inner header 26, the data area 28 and the inner check code 30 constitute an inner ECC (Error Correction Code) block 27 (displayed in a lateral rope block) for each one lateral line of the product structure. The inner ECC block 27 is sent to the digital modulator 11. The digital modulator 11 modulates the signals so that these signals can meet the characteristics of the recording unit, such as a VTR to which these signals are supplied.

Figure 2:
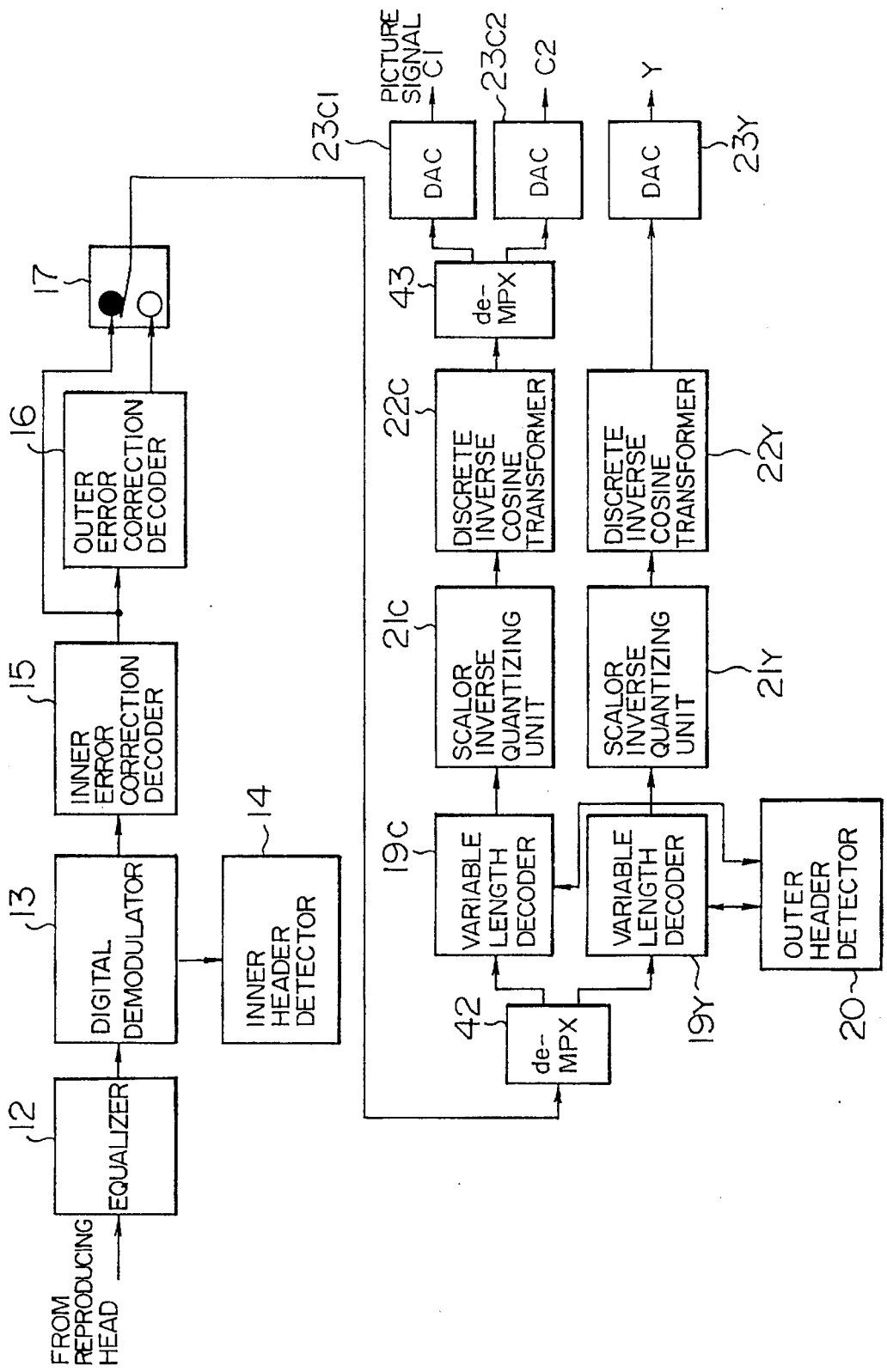

FIG. 2 shows the configuration of the decoding expanding circuit for a compression encoding digital signal. In the FIG. 12 denotes an equalizer, 13 denotes a digital decoder, 14 denotes an inner header detector, 15 denotes an inner error correction decoder, 16 denotes an outer error correction decoder, 17 and 18 denote switches for selecting the output of one, decoder 42 denotes a demultiplexer, $19c$ and $19y$ denote variable-length decoders, 20 denotes an outer header detector, $21c$ and $21y$ denote scalar inverse quantizing units, $22c$ and $22y$ denote discrete inverse cosine transformers, 43 denotes a demultiplexer, and $23c_1$, $23c_2$ and $23y$ denote digital-to-analog converters (DAC).

A compression encoding digital signal picked up by a reproduction head or the like is inputted from the left input side in FIG. 2, and the equalizer 12 compensates for the recording and reproducing characteristics of the recording unit, to perform an adjustment so that there is no malfunction of level decision in the digital decoder 13.

Figure 4:
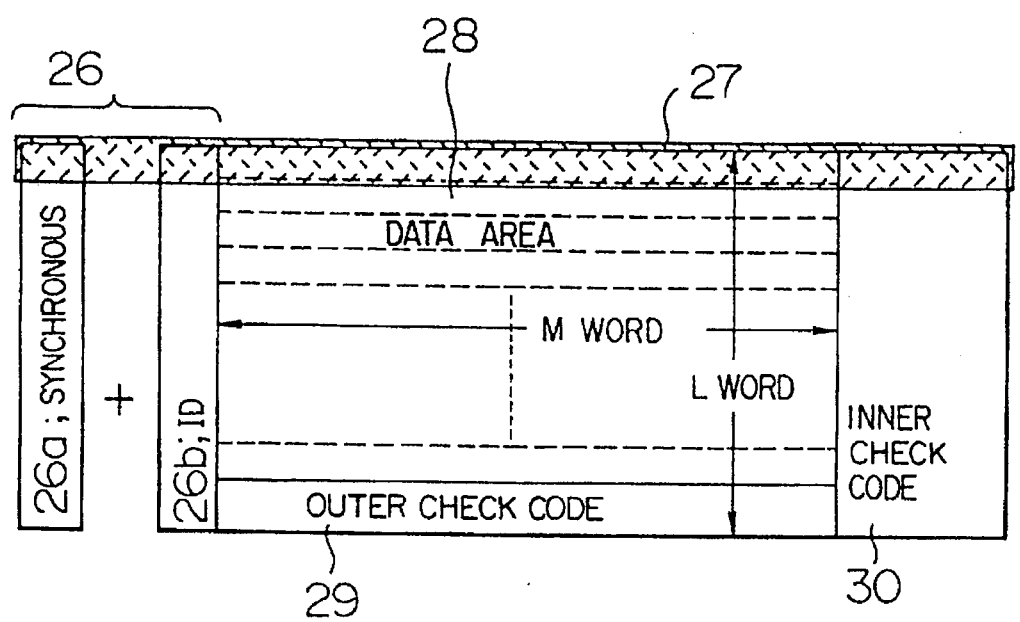
FIG. 4 is a diagram for showing the structure of an error correction code according to the structure of FIGS. 1 and 2.

A digital signal decoded by the digital decoder 13 has the inner header 26 detected by the inner header detector 14, to restore the block structure of the error correction signal in FIG. 4.

The inner error correction decoder 15 and the outer error correction decoder 16 correct or modify code errors due to drop-out or the like which occur in the tape head of the recording and reproducing system, for example. Through a white ball contact side of the selector 17, the signal is divided into a luminance signal y and a color differential signal C by the demultiplexer 42, and the data expanding process is carried out on the outputs of the variable-length decoders $19c$ and $19y$, after which the data are transmitted.

The variable-length decoders $19c$ and $19y$ divide the data in a unit of every block 25 of the discrete cosine transformation by using the outer header 24 detected by the outer header detector 20, and decode the data, of which the length is different depending on the block, to data of a fixed length. The scalar inverse quantizing units $21c$ and $21y$ restore the image signals (Y, $C_1$, $C_2$) through the demultiplexer 43 and the digital-to-analog converters $23c_1$, $23c_2$ and $23y$.

The normal data decoding expanding processing operation has been explained above. As described above, a recording unit such as a VTR generally has a high-speed reproducing function to find the heading of the screen. As is well known, in this high-speed mode, the magnetic head does not pick up a signal by tracing the same signal track as the one used for recording the data, but reproduces the data by picking up a part of the recorded signal by crossing the signal tracks. Therefore, when an attempt is made to reproduce a signal track on which the compression encoded data has been recorded, as shown in the product structure of the error correction code in FIG. 4, at a high speed, the data can not be picked up continuously in a large group of the product structure shown in FIG. 4.

At the time of decoding expanding processing of the compression encoding signal picked up in the high-speed reproduction mode, the selector 17 selects a contact of a black circle mark and the image signal is restored by the data which consists of only the inner ECC block 27 in one row of the lateral direction in the product structure shown in FIG. 4. In this case, an error of the combined data is corrected by only the inner inspection code 30. Therefore, the reliability of error correction is lower than the one in the case of normal reproduction. However, this method is sufficiently acceptable for the purpose of finding the header of the screen.

FIG. 4 shows a data format of the compression encoded data which is handled in the configuration of FIGS. 1 and 2 as described above. In the Figure, 26 denotes an inner header consisting of the synchronization signal $26a$ and the ID signal $26b$, 27 denotes an inner ECC block, 28 denotes a data area for disposing picture data including the outer header 24 shown in FIG. 3, 29 denotes an outer check signal, and 30 denotes an inner check code.

The discrete cosine transformers $2c$ and $2y$ set the length of the data area 28 within the inner ECC block 27 to M words (N<M), which is larger than N words of a mean code length of the conversion blocks that is determined by the recording capacity per unit time of a recording unit, such as a VTR or the like. (A word is a unit defined by the above-described error correction code.) Therefore, the outer header and the whole of the following data of the two-dimensional frequency component, which is arranged in the sequence of low to high degrees or most of the low-frequency component, are included in the inner ECC block 27. As a result, the outer header (24 in FIG. 4) which is necessary for the later stage data expanding process is first obtained from the inner ECC block 27 which has been picked up in the high-speed reproduction mode. Next, data of a component of low degrees of frequency of the discrete cosine transformation which is necessary for restoring the image signal is sequentially obtained effectively. Therefore, the decoding expanding processing can be carried out satisfactorily even if the signal has been picked up in the high-speed reproduction mode.

Figure 5:
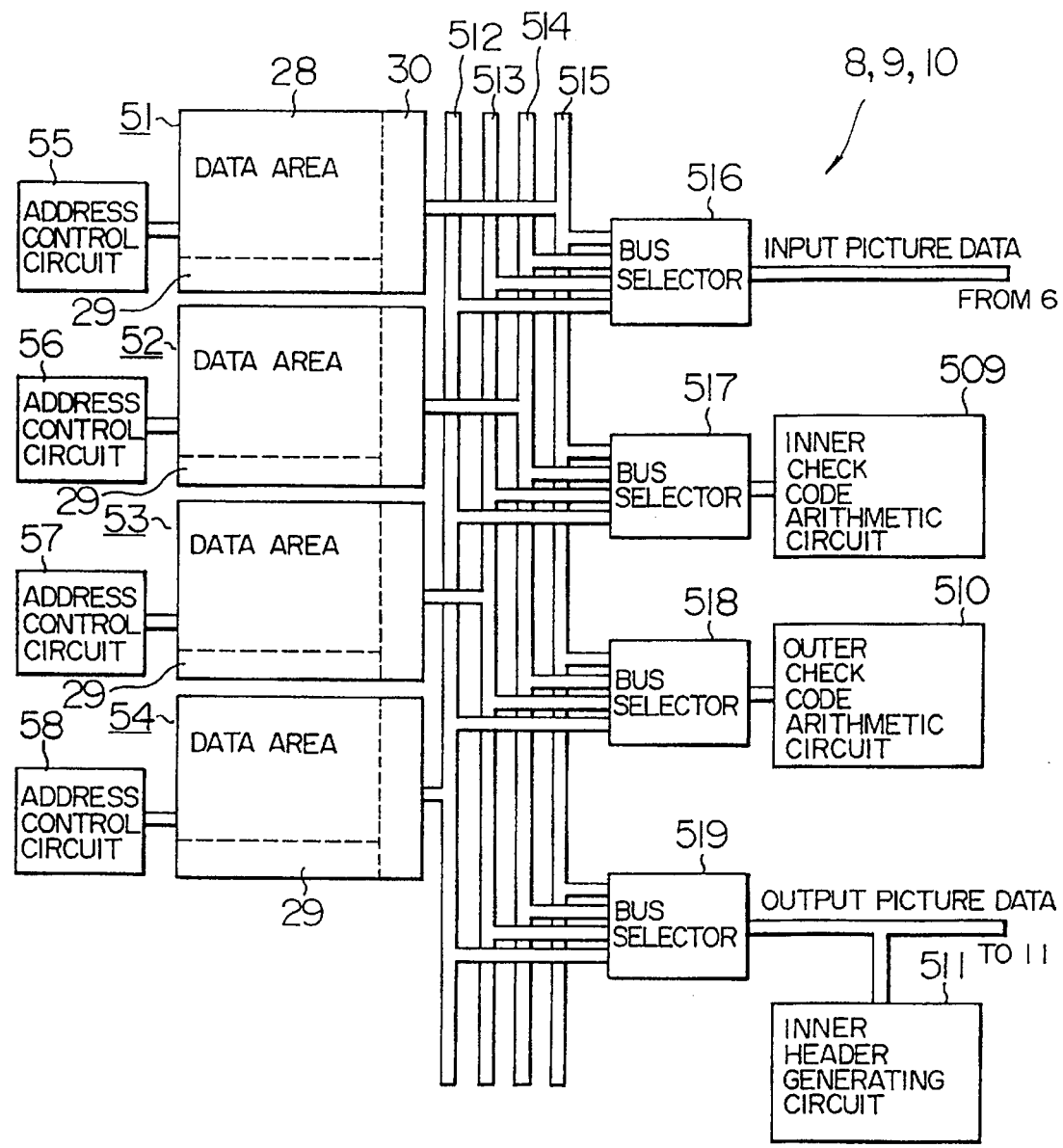
FIG. 5 is a block structure diagram for showing the structure of an inner error correction encoder, an outer error correction encoder and an inner header adder in FIG. 1.

For further supplementing the explanation, FIG. 5 is a diagram for showing the configurations of the inner error correction encoder 8, the outer error correction encoder 9 and the inner header adding circuit 10, for obtaining the error correction code. In FIG. 5, there is no clear distinction between the inner error correction encoder and the outer error correction encoder, but these are shared except for the arithmetic circuit and the inner header generating circuit foe generating the inner check code and the outer check code.

In FIG. 5, 51, 52, 53 and 54 denote data memories, 55, 56, 57 and 58 denote address control circuits for the data memories, 509 denotes an inner check code arithmetic circuit, 510 denotes an outer check code arithmetic circuit, 511 denotes an inner header generating circuit for synchronization and identification, 512, 513, 514 and 515 denote data buses, and 516, 517, 518 and 519 denote bus selectors.

The four data memories 51 to 54 can write and read words at one time, with one word including eight bits, by repeating the following four operating cycles mutually exclusively.

In the first cycle, input data from the buffer memory 6 is written in a corresponding data memory (which is one of 51 to 54) through one data bus (which is one of 512 to 515) selected by the bus selector 516. Each of the data memories 51 to 54 has an data area 28, an outer check code area 29 and an inner check code area 30, and the input data is sequentially written in the row direction in the data area 28.

In the second cycle, a corresponding data bus is selected by the bus selector 518. After the data has been read in the column direction, the outer check code is generated by the outer check code arithmetic circuit 510 for each data of one column, and the data is written in the outer check code area 29.

In the third cycle, a corresponding data bus is selected by the bus selector 517. After the data has been read in the row direction, the inner check code is generated by the inner check code arithmetic circuit 511 for each data of one row, and the data is written in the inner check code area 30.

In the fourth cycle, the data including the inner and outer check codes are read in the row direction. The bus selector 519 selects a data bus corresponding to the data memory in the fourth cycle and outputs data. In this case, in order to structure the inner ECC block, the synchronization and identification signals generated by the inner header generating circuit 511 are added to the data and the inner check code corresponding to one row, and the recording data is sent to the next stage digital modulating circuit (11 in FIG. 1).

In this case, the size of the data area 28 of the data memory for determining the data size of the error correction code, that is the M words and L words in FIG. 4, is determined, for example, as follows.

A recording unit is a digital VTR for recording data by setting the quantity of picture data per one field to almost a predetermined level; the rotation number of the drum is F times the field rate of the picture signal; a pair of H heads are disposed face to face at 180 degrees; the VTR simultaneously records H pieces of data, to record picture data of one field on $(2 \times F \times H)$ tracks; there are E ECC blocks per one track; and the picture data is divided into B processing blocks. Under the above assumption, the following relationship is set:

$$L < B / (2 \times F \times H)$$

Thus, M is set to be longer than a mean data length per one block processing unit which is given by $(L \times M \times 2 \times F \times H)/B$.

Although in the above explanation, there are four data memories 51 to 54 and the operation is carried out in four cycles, it is also possible to use only one high-speed data memory to process a plurality of cycles in time division, thus reducing the number of data memories used.

Next, with reference to FIGS. 6 to 14, another embodiment will be explained according to which the picture quality or the picture quality recognition level in the high-speed reproduction mode can be improved by increasing the proportion of data which is useful in restoring the picture in the inner ECC block 27 that can be partially inputted in the decoding expanding processing process corresponding to the high-speed reproduction mode of the above data.

Figure 6:
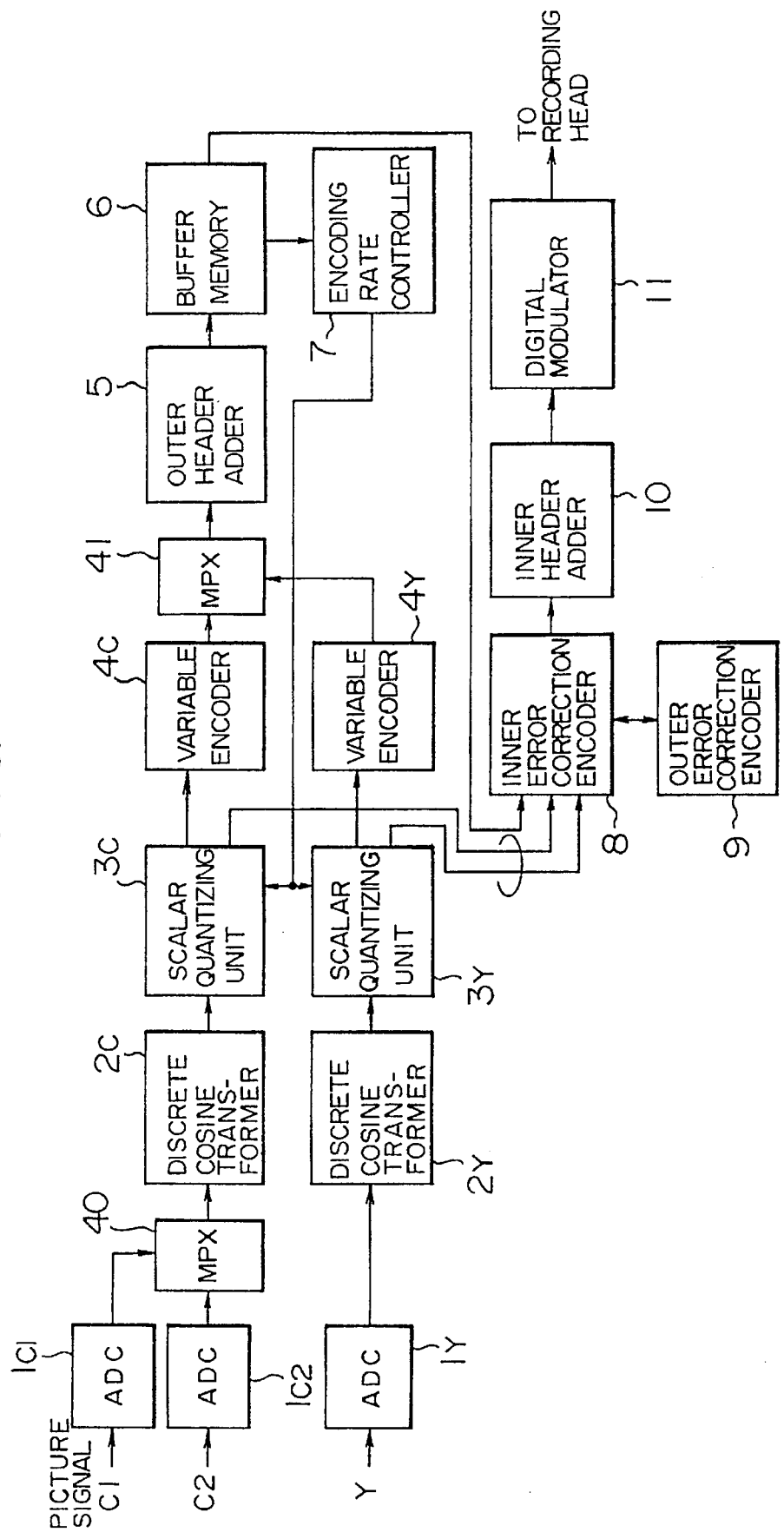
FIGS. 6 and 7 are block structure diagrams for a compression encoding system and a decoding expanding system according to another embodiment of the present invention, respectively.
Figure 7:
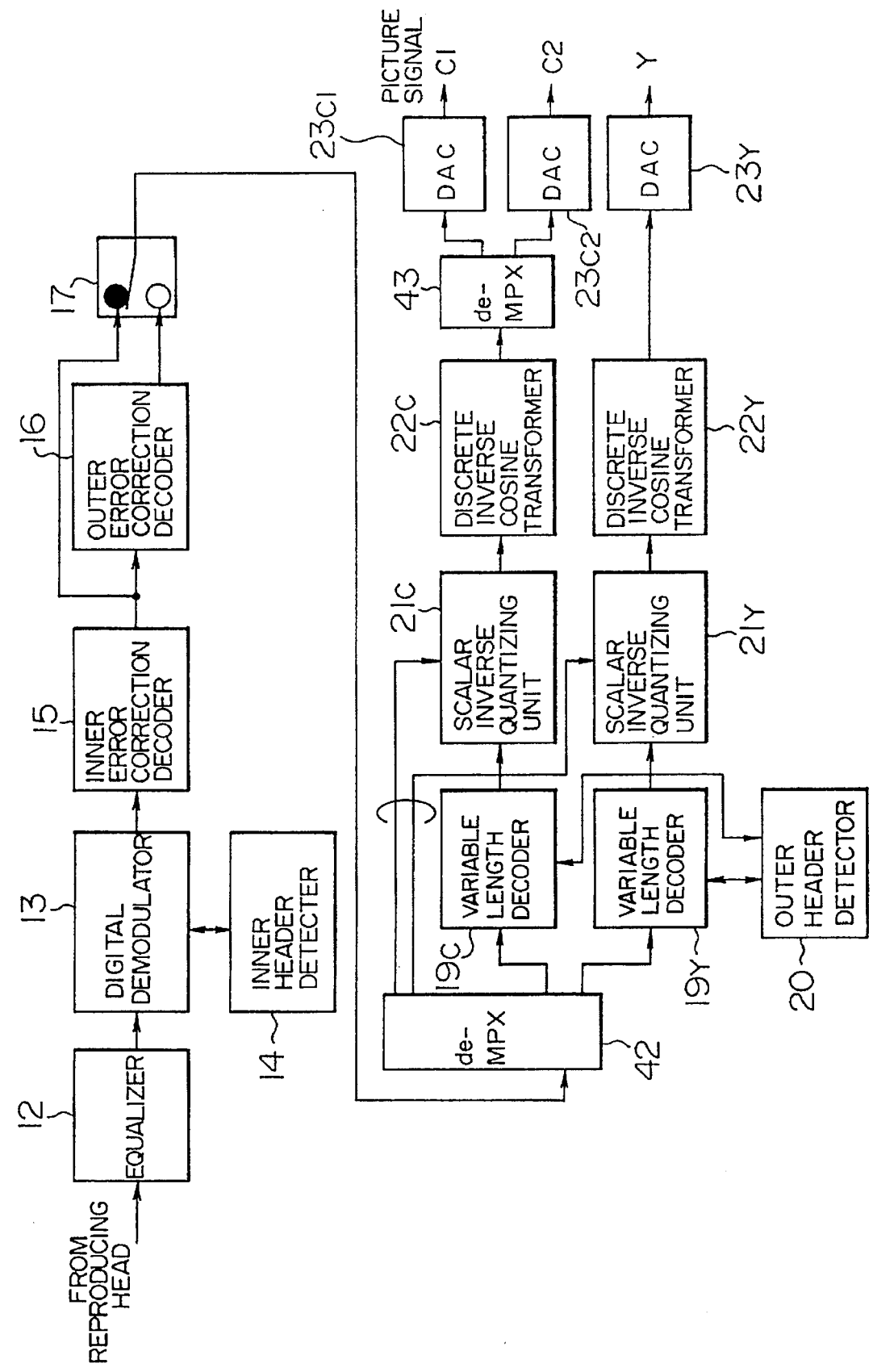
Figure 8:
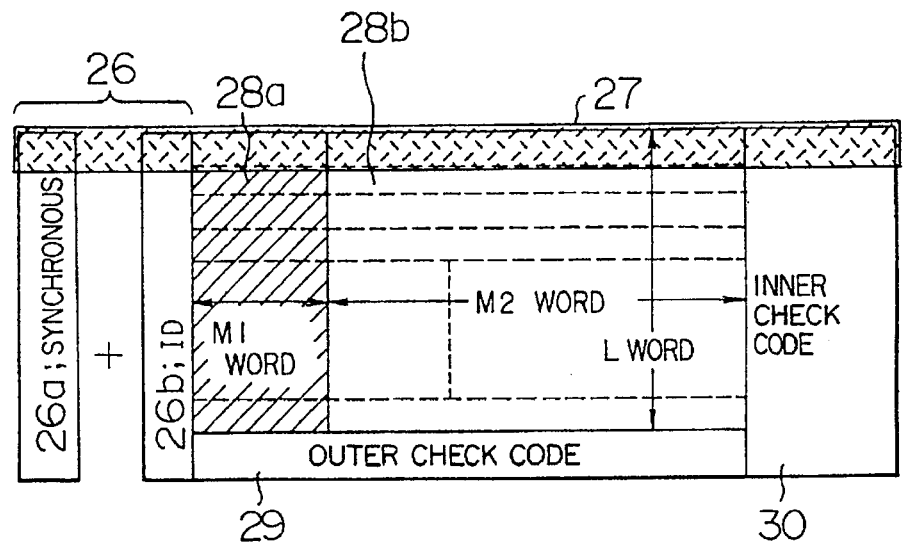
FIG. 8 is a diagram for showing the structure of an error correction code according to the structure of FIGS. 6 and 7.

FIGS. 6, 7 and 8 show a data compression encoding processing system, a decoding expanding processing system according to another embodiment, and a recording format handled by the configurations of these systems. The compression encoding processing system in FIG. 6 is different from the configuration shown in FIG. 3 in that a line has been added for outputting data of a fixed length from the scalar quantizing units 3c and 3y directly to the inner error correction encoder 8. The decoding expanding processing system in FIG. 7 is different from the configuration shown in FIG. 2 in that a line has been added for supplying data of a fixed length from the demultiplexer 42 to the scalar increase quantizing units 21c and 21y.

In the data format of FIG. 8 used in the configurations shown in FIGS. 6 and 7, the data area (8 in FIG. 4) includes a fixed-length data area 28a and a variable-length data area 28b. The fixed-length data is an expression in a fixed length of a low-frequency component such as the component (=DC) of picture data (0.0) which is a result of a discrete cosine transformation, for example. The ID signal 26b of the inner header shows not only the address for restructing the error correction code but also a positional address of the conversion block of the fixed-length data on the screen. The length M of the data area 28 of the inner ECC block 27 is set to be almost equal to the mean code length N of the conversion block, so that each remaining inner ECC block 27 except inner ECC block 27 composed of outer check code 29 contains fixed-length data area 28a placing the fixed-length data.

As a result, the DC component or the low-frequency component including DC which is the most important in restoring the picture out of the discrete cosine transformed component exists, in most of the cases, in the inner ECC block 27 in which the picture data recorded in the format of FIG. 8 has been picked up in the high-speed reproduction mode, so that an effective restoration of the picture becomes possible. According to the present method, the length of the data area of one inner ECC block 27 (M=M1+M2) can be reduced to the mean code length N, so that, in the high-speed reproduction mode, the number of complete inner ECC blocks 27 in which the start to the end of the inner block that can be picked up becomes large. In this respect, as well, the efficiency of picture restoration in the high-speed reproduction mode can be improved.

In the combination of FIG. 6 for handling the format shown in FIG. 8, the inner error correction encoder 8, the outer error correction encoder 9 and the inner header adding circuit 10 are structured as shown in FIG. 5, and the writing positions within the data memories 51 to 54 are set to match the format of FIG. 8. The write control of various data is carried out to match this setting. The configuration of FIG. 5 can be similarly applied to the following embodiment.

Figure 9:
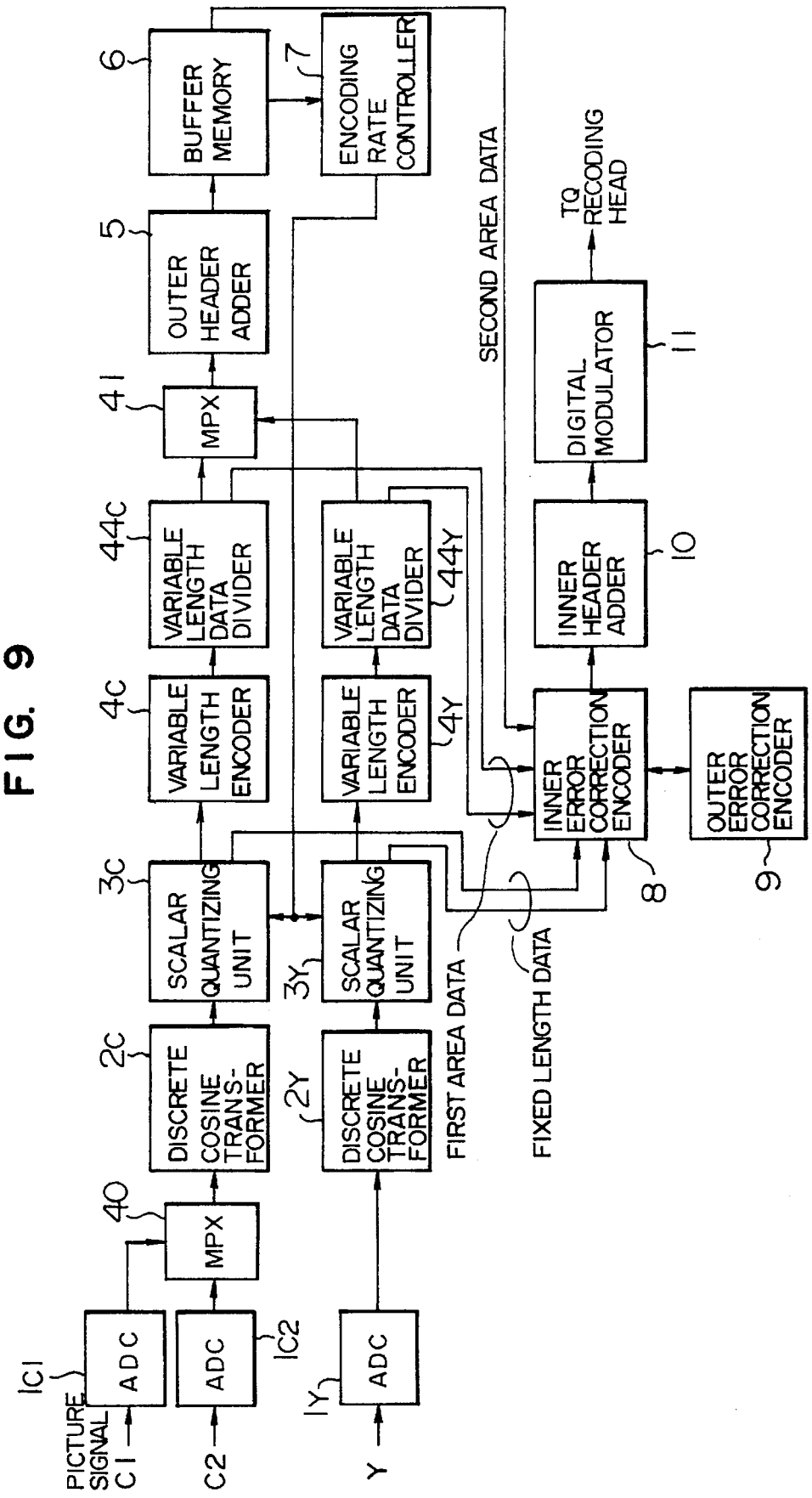
FIGS. 9 and 10 are block structure diagrams for a compression encoding system and a decoding expanding system according to still another embodiment of the present invention.
Figure 10:
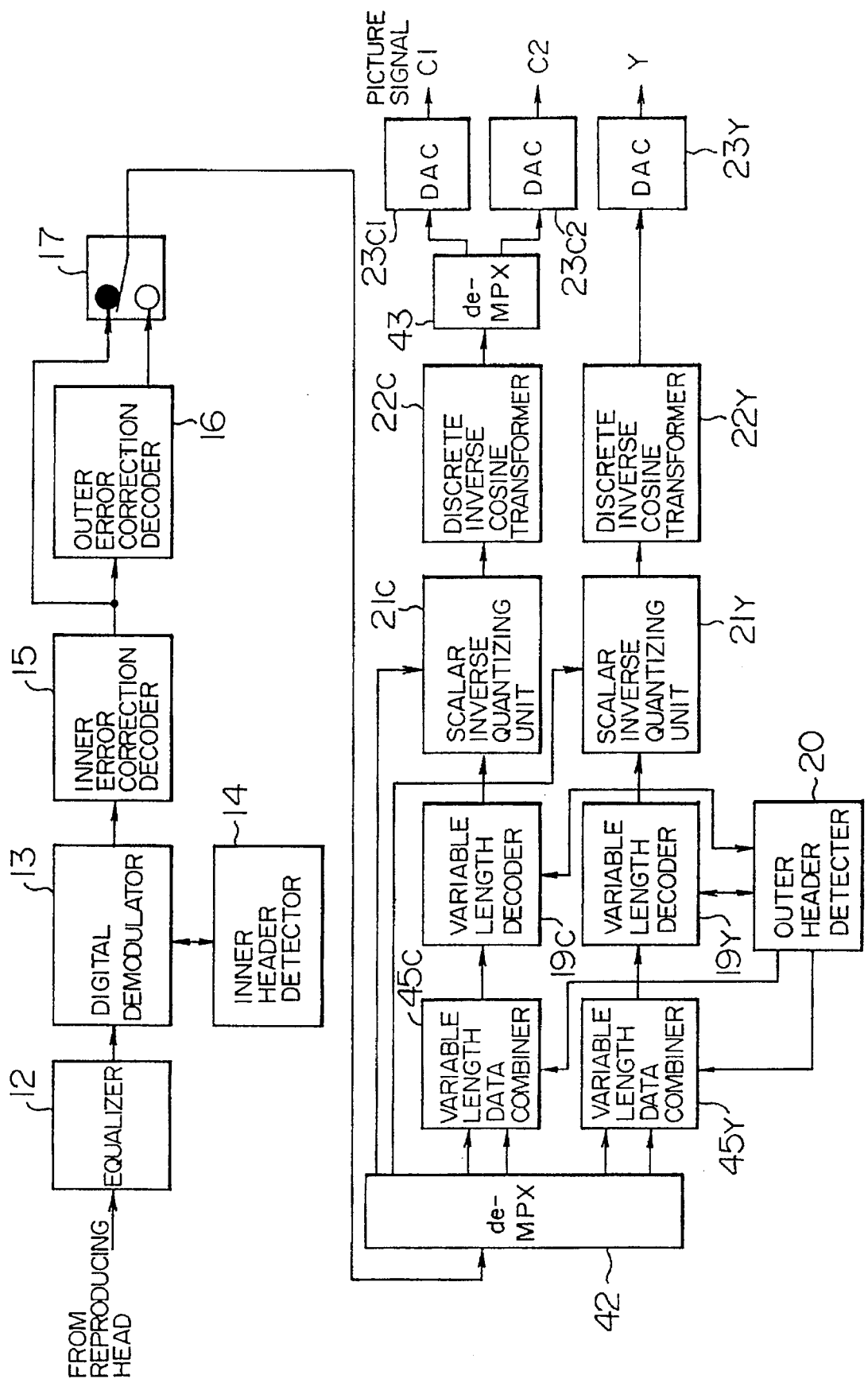

Another embodiment is shown in FIGS. 9, 10, 11A and 11B. In the block structure of the present invention shown in FIG. 9, variable-length data dividers 44c and 44y are further provided at the output side of the variable-length encoders 4c and 4y shown in FIG. 6. The outputs of the variable-length encoders 4c and 4y are inputted to the variable-length data dividers 44c and 44y, which divide the data into first area data and second area data at a predetermined ratio. The second area data is supplied to the multiplexer through the existing line and a line is provided for outputting the first area data to the inner error correction encoder 8. The configuration of FIG. 10 is different from the configuration of FIG. 7 in that variable-length data combiners 45c and 45y at the later stage of the multiplexer 42, and the first area data and the second area data that are the result of a division by the variable-length data dividers 44c and 44y are combined together and the result is outputted to the variable-length demodulators 19c and 19y. A signal from the outer header detector 20 is also supplied to the variable-length data combiners 45c and 45y.

Figure 11A:
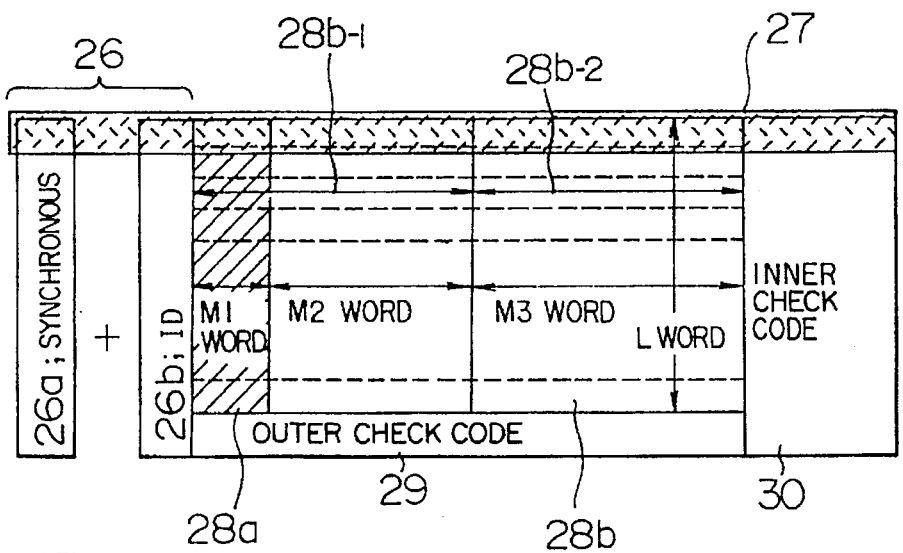
FIGS. 11A and 11B are diagrams for showing the structure of an error correction code according to the structures of FIGS. 9 and 10.
Figure 11B:
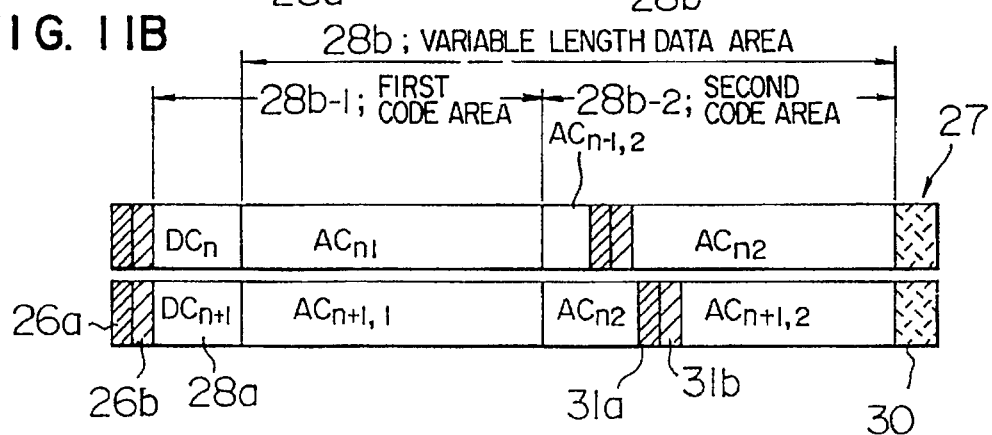

FIG. 11A is a diagram for showing the whole structure of the compression encoded error correction code which is handled in the configurations of FIGS. 9 and 10, and FIG. 11B is a diagram for showing the details of the inner ECC block 27. In FIGS. 11A and 11B, those portions which are the same as those in FIGS. 4 and 8 are referenced with the same symbols. In FIG. 11A 28b-1 denotes a first code area, 28b-2 denotes a second code area, 31a denotes an outer synchronization signal and 31b denotes an outer ID signal. What is characteristic in FIGS. 11A and 11B is that the variable-length data area 28b is divided into two areas which store the picture data that is a result of composing the fixed-length data area 28a and one of the two divided areas into the first code area 28b-1 and the second code area 28b-2.

FIG. 11B shows an example of the inside of the two continuous inner ECC blocks 27. The first code area 28-1 stores the fixed-length data and a part of the variable-length data by causing the discrete cosine transformation block to correspond to the inner ECC block 27 of the error correction code at a proportion of one to one. The second code area 28b-2 stores the rest of the variable-length data regardless of this correspondence relationship. The first code area 28b-1 continues to the synchronization signal 26a for recognizing the start of the inner ECC block 27 and the ID signal 26b for recognizing the addresses of the inner ECC block 27 and the corresponding conversion block, and is structured by data of a low-frequency component including the DC component of the compressed data.

In the configuration of FIG. 11, the data of the DC component is expressed in a fixed length and is stored in the fixed-length data area 28a. However, there is no limitation to this above, but these data may also be stored in the first code area 28b-1 as the variable-length data which is the same as the data of another AC component, without distinction of DC and AC data. The encoded picture data of each data conversion block has variable-length encoded data for the size of each frequency component which has been laid out from the low-frequency component in the stage of encoding. Therefore, the code columns are sequentially stored in the first code area 28b-1. The second code area 28b-2 stores the code of an AC component which can not be stored in the first code area 28b-1, and later, an inner check code 30 is added. The codes of the AC component to be stored in the first and second code areas will hereinafter be referred to as the first and second AC components respectively. The second code area 28b-2 of each inner ECC block 27 will continuously store the data of the second AC component.

As shown in FIGS. 11A and 11B, the storing of the code of the second AC component of the current data conversion block is started after the end position of the variable-length data of the preceding data conversion block. The code length of the second AC component varies for each block, and therefore, the starting position of the second AC component of the code of each conversion block is not constant. In order to make it possible to recognize this starting position and the address of the corresponding conversion block, an outer synchronization signal 31a and an ID signal 31b are added to the header of the second AC component. The inner check code 30 is for the data included in the whole of the inner ECC block 27. When the quantity of data generated in one data conversion block is smaller than the data quantity that can be stored in the first code area 28b-1, the surplus portion is filled by repeating invalid data or the same data.

According to the configurations of FIGS. 9, 10, 11A and 11B, the picture can be restored by using the data of the low-frequency component as well as the DC component from the data of the inner ECC block 27 which is picked up in the high-speed reproduction mode, so that the picture quality in the high-speed reproduction mode can be improved further.

FIGS. 12, 13 and 14A, 14B and 14C show still another embodiment of the present invention. According to the configuration of FIG. 12, a linkage address generating circuit 46 is additionally provided which receives an input from the output of the multiplexer 41, generates a linkage address and produces an output to the inner error correction encoder 8. Further, the decoding expanding system in FIG. 13 includes, in addition to the configuration shown in FIG. 10, a linkage address detector 47 for detecting a linkage address from the output of the demultiplexer 42 and variable-length data combiners 19c and 19y for combining the variable-length data based on the detected value.

Figure 12:
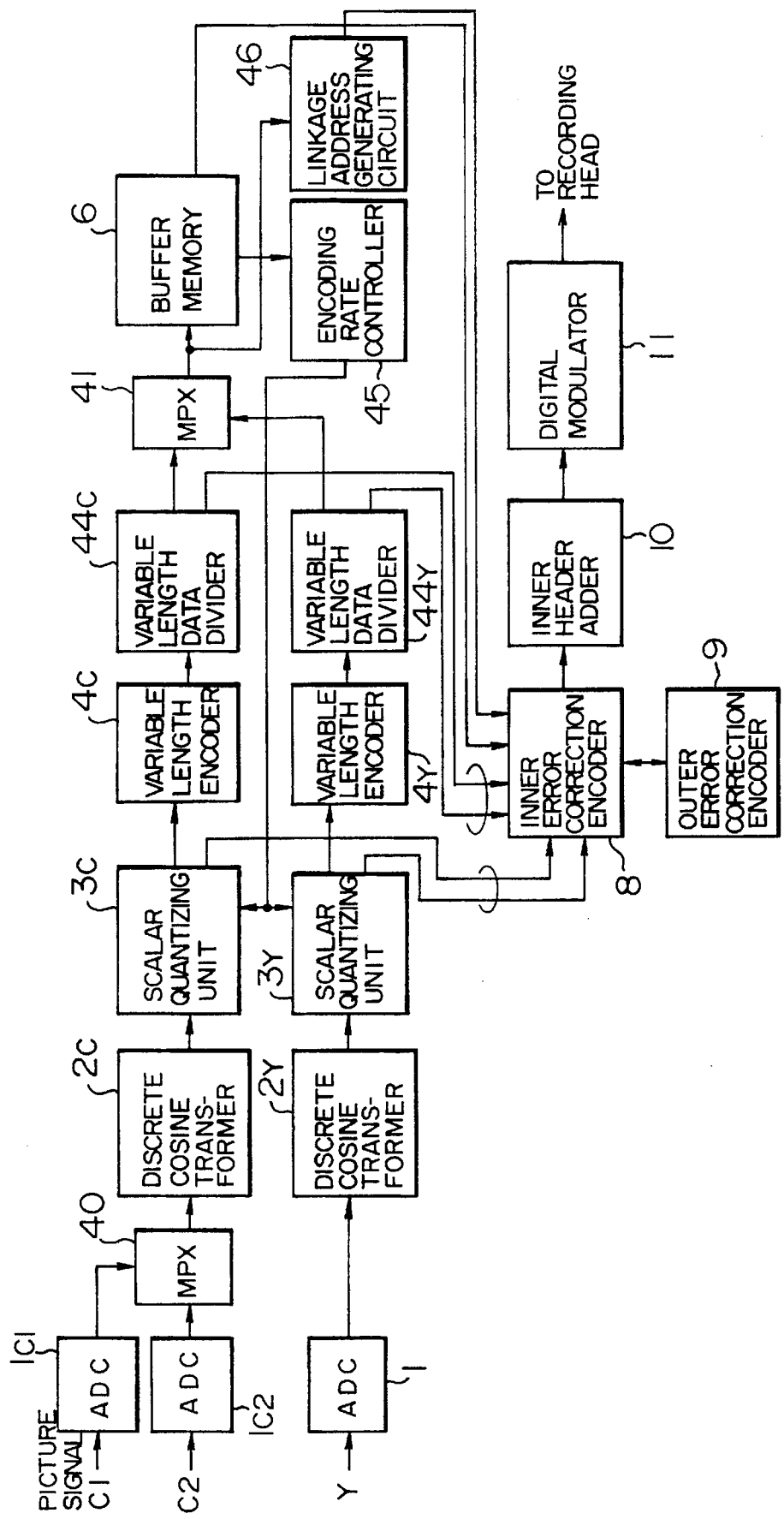
FIGS. 12 and 13 are block structure diagrams for a compression encoding system and a decoding expanding system according to still another embodiment of the present invention.
Figure 13:
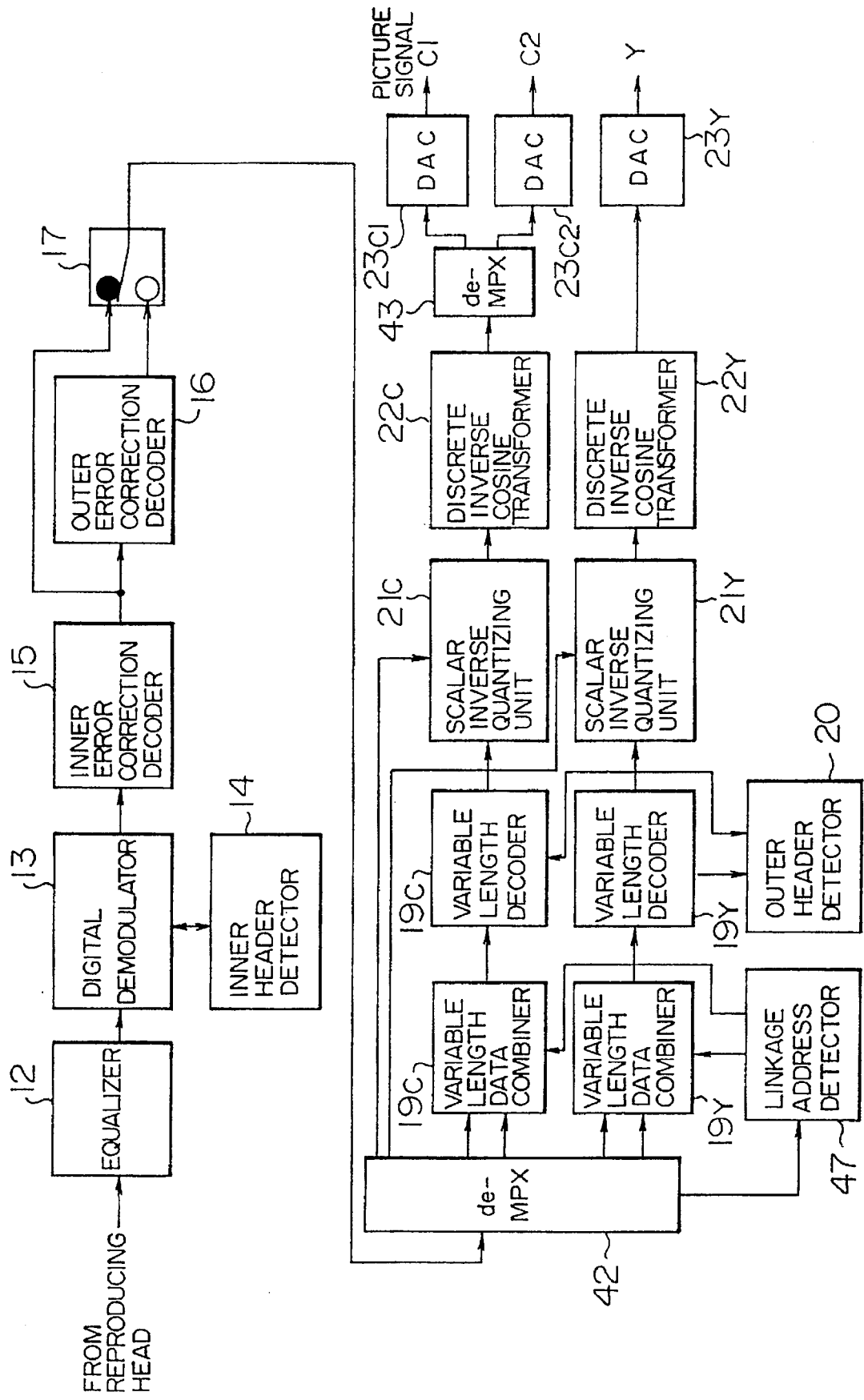
Figure 14A:
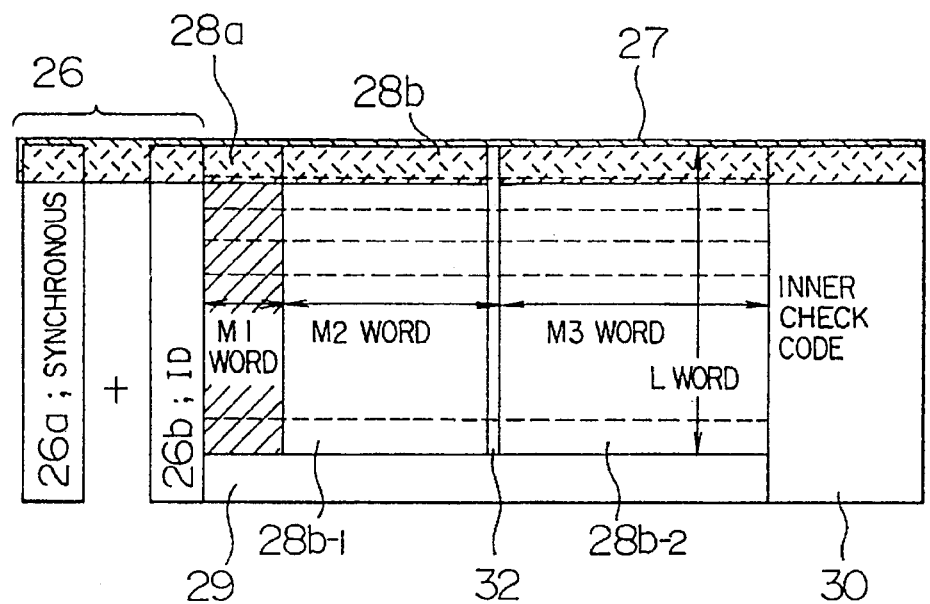
FIGS. 14A, 14B and 14C are diagrams for showing the structures of an error correction code according to the structures of FIGS. 12 and 13.
Figure 14B:
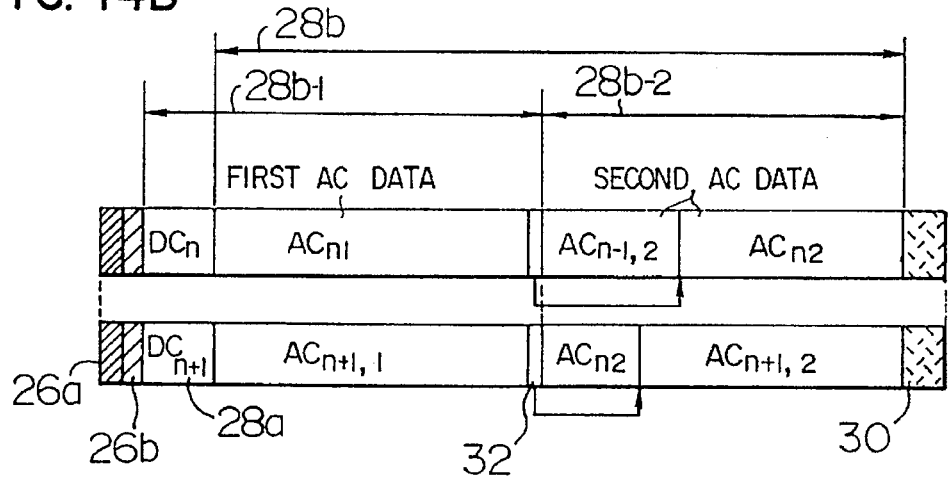
Figure 14C:
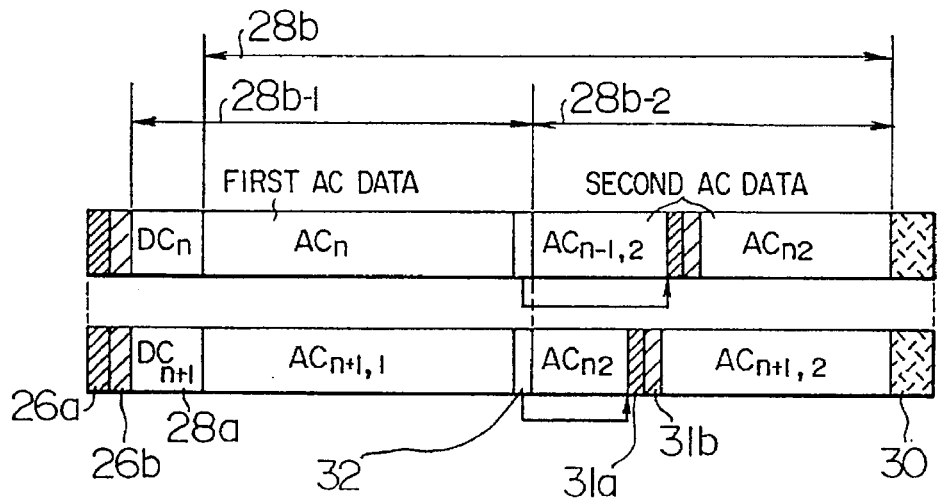

FIG. 14A shows the overall configuration of the error correction code which is handled in the configurations of FIGS. 12 and 13. FIG. 14B shows a first example of the inside of the inner ECC block, and FIG. 14C shows a second example of the inside of the inner ECC block. In FIGS. 14A, 14B and 14C, those error correction codes having the same configurations as those shown in the preceding diagrams are referenced with the same symbols. In these Figures, 32 denotes a linkage address.

The characteristics of the present recording method reside in the linkage address 32 being added to the first code address 28B-1. The linkage address 32 shows the address of the starting point of the second AC component in the second code area 28b-2 which follows after the DC and the first AC component data of the data conversion block in the first code area 28b-1 of the inner ECC block 27, as shown in FIG. 14B, and links the data of the first code area 28b-1 with the data of the second code area 28b-2.

On the configuration of FIG. 14C, an outer synchronization signal 31a and an outer ID signal 31b are disposed in front of the second AC data in the same configuration as shown in FIG. 11, in addition to the linkage address 32, so that the linkage information is duplexed so as to be relatively immune to error. It is needless to mention that this configuration can effectively contribute to improving the picture quality in the high-speed reproduction mode in the similar manner as the configuration shown in FIG. 11.

Figure 16:
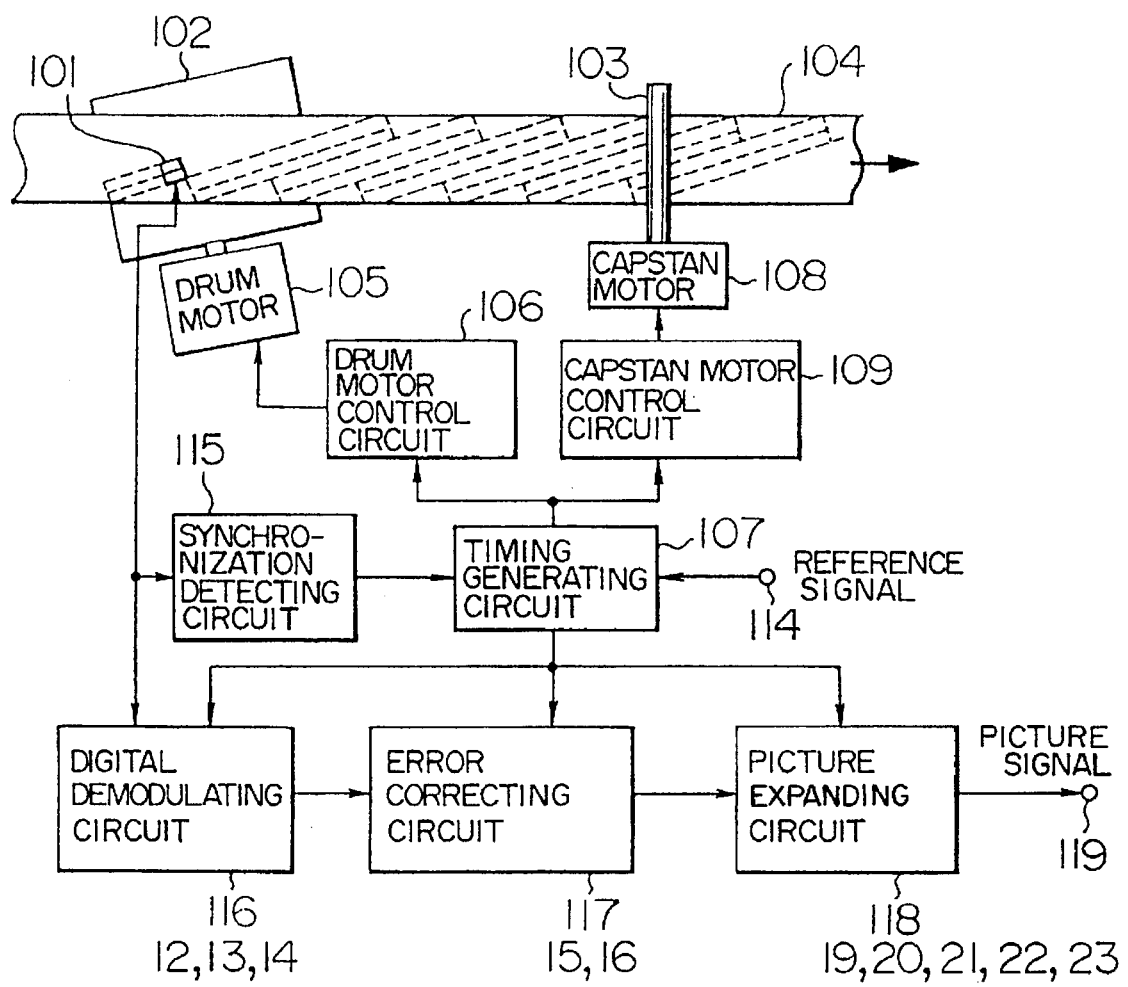
FIG. 16 is a configuration diagram of a digital VTR reproducing system utilizing the configuration of the decoding expanding system according to the present invention.

FIGS. 15 and 16 show examples of digital VTR's which employ a recording method for obtaining data to be recorded in the recording unit by adding an error detection code to the above-described picture data. FIG. 15 is a configuration diagram for showing the recording unit and FIG. 16 is a configuration diagram for showing the reproducing unit. In FIG. 15, 101 denotes a magnetic head, 102 denotes a drum loading the magnetic head, 101, 103 denotes a capstan, 104 denotes a magnetic tape, 105 denotes a drum motor, 106 denotes a drum motor control circuit, 107 denotes a timing generating circuit, 108 denotes a capstan motor, 109 denotes a capstan motor control circuit, 110 denotes a digital modulating circuit, 111 denotes an error check code adding circuit consisting of, for example, the blocks 8, 9 and 10 in FIG. 1, 112 denotes a picture encoding compressing circuit consisting of the blocks $1c_1$, $1c_1$, $1y$ to 7 in FIG. 1, and 113 denotes an input terminal for a picture signal.

A picture signal is inputted from the input terminal 113, to the picture encoding compressing circuit 112 and the timing generating circuit 107. The timing generating circuit 107 generates various timing signals for recording VTR signals. The picture encoding compressing circuit 112 divides each field of the input image signal into a lot of blocks, to encode by blocks. The compression encoding is carried out in three stages including data conversion, quantization and variable-length encoding as shown in the embodiment of FIG. 1, for example. The data conversion processing in the first stage is a process for converting a picture signal, which is a signal level of each pixel, into a frequency component of a wide definition. The quantization in the second stage is the process for quantizing by using a step width for quantization set for each frequency component. And, the variable-length encoding (also called the entropy encoding) in the third stage is the process for rearranging each frequency component that has been quantized into a sequence of one-dimensional numbers based on a predetermined rule so that the numbers are arranged from the low-frequency component to the high-frequency component and for generating variable-length codes by using the run-length encoding method or the Huffman encoding method for the sequence of the one-dimensional numbers. By changing the quantization conditions in the combination of quantization and variable-length encoding, the compression factor of the variable-length code of the output can be changed. The picture data recording unit encodes by suitably changing the quantization conditions for the input picture by blocks in order to have a constant quantity of data generation in each field. In this way, the variable-length encoded picture data is added to the error check code adding circuit 111. The error check code adding circuit 111 adds a synchronization signal, an ID signal and inner and outer check codes for each inner ECC block unit, thus generating an error correction block.

The check code is for correcting a code error which occurs when encoding picture data is recorded or reproduced in a recording medium, such as a magnetic tape. The digital modulating circuit 10 modulates the data, generates a recording signal and supplies the signal to the magnetic head 101. The magnetic head 101, the drum 102, the drum motor 105, the drum control circuit 106, the capstan 103, the capstan motor 108 and the capstan motor control circuit 109 are used, to carry out a normal recording operation for the VTR, and the picture data is thus recorded on the magnetic tape 104.

FIG. 16 shows a reproducing unit for the digital VTR as described above, and the configuration elements which are the same as those in the recording unit of FIG. 15 are referenced with the same symbol marks. In FIG. 16, 114 denotes a reference signal input terminal, 115 denotes a synchronous detecting circuit, 116 denotes a digital demodulating circuit consisting of, for example the blocks 12, 13 and 14 shown in FIG. 2, 117 denotes an error correction circuit consisting of the blocks 15 and 16 in FIG. 2, 118 denotes a picture compound expanding circuit consisting of the blocks 19, 20, 21, 22 and 23 in FIG. 2, and 119 denotes an output terminal for the image signal.

A signal reproduced by the magnetic head 101 is supplied to the synchronous detecting circuit 115 to extract various synchronous signals, and the signal supplied from the magnetic head 101 to the digital decoding circuit 116 is used to demodulate the digital picture data. By this demodulation, A series of the inner ECC blocks is obtained. The error correction circuit 117 restructures the whole of the error correction code from these inner ECC blocks in the normal reproduction time, and detects, corrects or modifies an error by using the inner check code and the outer check code.

During the high-speed modulation, only the inner check code is used to detect, correct and modify an error by using the inner ECC block as a unit. The picture data after the error correction is supplied to the picture data decoding expanding circuit 118 to carry out the processing inverse to the one performed by the picture data encoding circuit 112 at the time of recording. That is, the variable-length code decoding, inverse quantization, data inverse conversion and inverse blocking are carried out. By the above processings, the image signal is reproduced and is then outputted from the output terminal.

Figure 17:
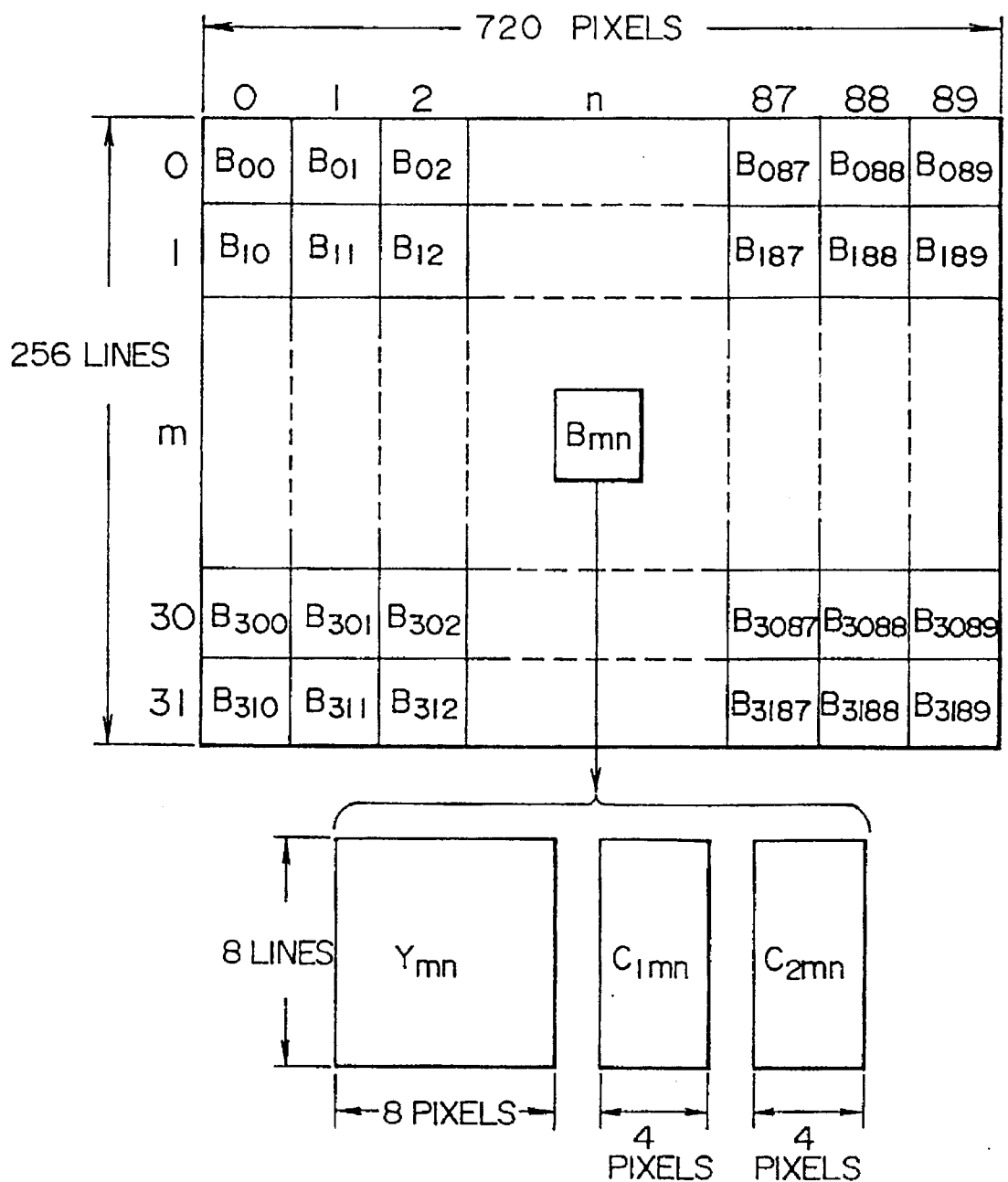
FIG. 17 is a diagram showing an example of the division of a field screen block.

FIG. 17 shows one example for dividing the field screen in blocks by the picture encoding compressing circuit shown in FIG. 15. The field screen is structured by the pixels of 720 samples times 256 lines. The pixels are also structured by luminance signal data consisting of 720 samples per one line and data of two color differential signals consisting of 360 samples per one line after the samples have been reduced at every two samples in the horizontal direction. The blocks which become the unit of compression signal processing are generated by dividing the field screen into 90 parts in the horizontal direction and into 32 parts in the vertical direction. In other words, one block includes luminance signal data of 8×8 samples and data of two color differential signals each including 4×8 samples. Assume a block $B_{mn}$ which is the m-th block in the vertical direction and the n-th block in the horizontal direction. In this case, the picture data is first stored in the memory and is then read in block unit in the sequence of B00, B01, - - -, B089, B10, - - -, B3189. Then, the data is compressed for each block.

For a digital VTR, a system has been considered for recording a signal with a plurality of magnetic heads on a plurality of channels and recording data of one field on a plurality of tracks, because in general data quantity per unit time is large and the rate of recording the data is high. Assume the data of one field is recorded on two tracks and the recording signal is divided into two channels and these are simultaneously recorded on two tracks with two magnetic heads, as shown in FIG. 15. When the recording signal is divided into two channels, a signal of the blocks with an odd number for m+n is allocated to one channel out of the blocks $B_{mn}$ ($0 \leq m \leq 31$, $0 \leq n \leq 89$) that constitute the field screen, and a signal of the blocks with an even number for m+n is allocated to the other channel, thus structuring the recording signals. When the blocks belonging to one channel are colored white and the blocks belonging to the other channel are colored black, the screen becomes a checker pattern. In this case, even if trouble has occurred in a certain magnetic head so that a signal can not be reproduced, correct data reproduced by the other magnetic heads is uniformly distributed to the whole screen. Therefore, it is possible to prevent deterioration of the picture quality.

When the positional relationship between a magnetic head and a block on the screen for recording and reproducing is always constant, a portion of a signal which can not be reproduced correctly is fixed to the screen and an extreme deterioration of the picture quality results if a certain magnetic head has become unable to reproduce a signal for a long time. Therefore, if the recording signal is so structured that when one of the magnetic heads has recorded the block $B_{mn}$ where m+n is an even number and the other magnetic head has recorded the block of which m+n is an odd number for a certain field signal, the former magnetic head records the block of which m+n is an odd number and the latter magnetic head records the block of which m+n is an even number for the next field signal, then it is possible to prevent deterioration of the picture quality because there occurs no portion of the signal which can not be reproduced correctly even if a part of the magnetic heads has become unable to reproduce signals.

Figure 18:
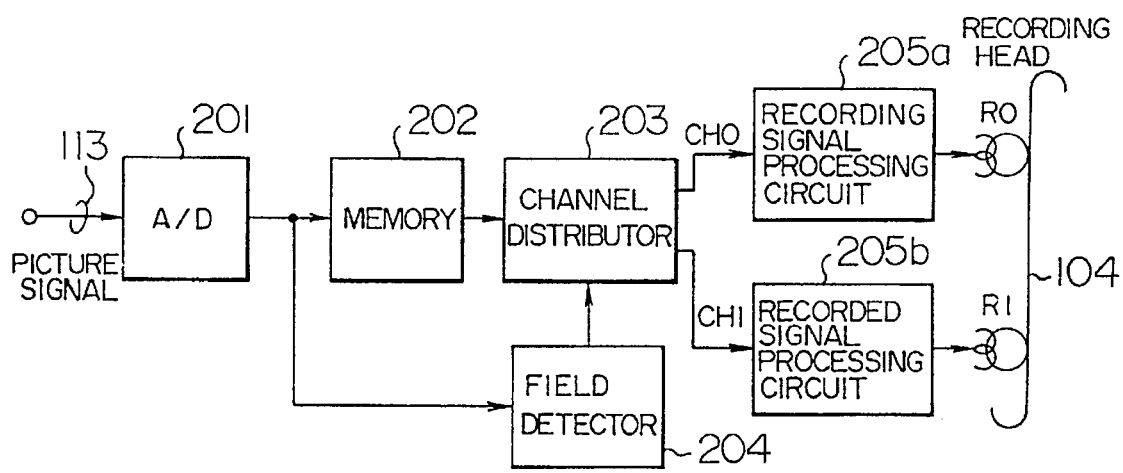
FIGS. 18 and 19 are block structure diagrams for realizing the embodiment of FIG. 17.
Figure 19:
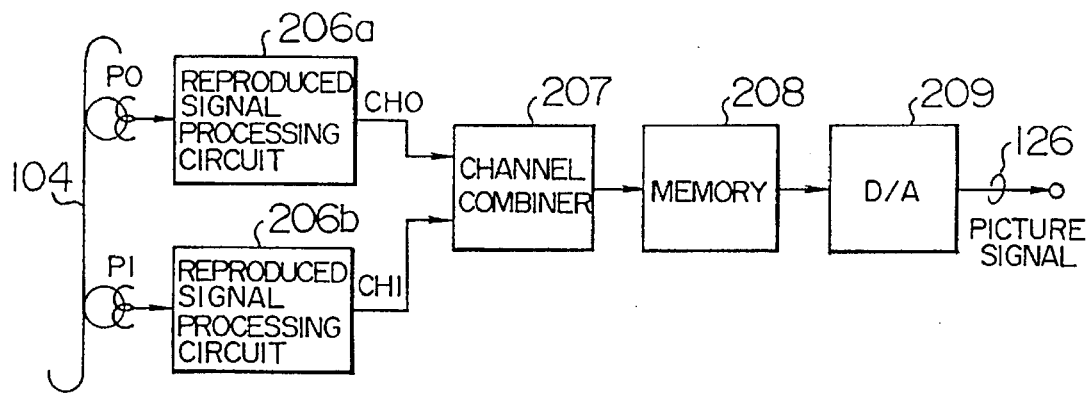

FIG. 18 shows the configuration of a recording circuit and FIG. 19 shows the configuration of a reproducing circuit for realizing the embodiment shown in FIG. 17. In the Figures 201 denotes an AD converter, 202 denotes a memory, 203 denotes a channel distributor, 204 designates a field detector, 205a and 205b designate recording signal processing circuits, R0 and R1 denote recording heads, P0 and P1 denote reproducing magnetic heads, 206a and 206b denote reproduction signal processing circuits, 207 denotes a channel combiner, 208 denotes a memory, and 209 denotes a DA converter. An image signal 113 consisting of a luminance signal and two color differential signals is encoded by the AD converter 201. In this case, the analog-to-digital converters $1c_1$, $1c_2$ and $1y$ at the image signal input side and the digital-to-analog converters $23c_1$, $23c_2$ and $23y$ at the image signal output side shown in FIGS. 1 and 2 respectively are not necessary.

Referring to FIG. 18, a picture signal which has been inputted is A/D converted, stored in the memory 202, and is then sequentially read by blocks to be compression processed. The channel distributor 203 selects channel CH0 or CH1 for recording the signal depending on whether the value of m+n of the inputted block $B_{mn}$ is an odd number or an even number. The field detector 204 detects whether the field of the picture signal currently being inputted is an even field or an odd field. In this case, for example, when the input picture signal from the field information is an even-number field, the block data $B_{mn}$ the value of m+n for which is an odd number is recorded on CH0, and the block data the value of m+n for which is an even number is recorded on CH1. When the input picture signal is an odd-number field, the block data are recorded on the channels opposite to the ones on which the block data are recorded when the input picture signal is an even-number field.

The recording signal processing circuit 205 compresses, adds ID signals, adds error correction codes and modulates the distributed signals, so that the recording signals are guided to the two recording heads R0 and R1. At the time of reproduction, the reproduction signal processors 206a and 206b equalize, demodulate, correct error and expand the signals reproduced from the two reproducing magnetic heads P0 and P1, and then the channel combiner 207 and the memory 208 rearrange these signals into the original encoded image signals based on the ID signals including the information of the block positions, and the DA converter 209 outputs the image signals.

According to the configurations shown in FIGS. 18 and 19, the blocks have been allocated based on the field signal detected by the field detector 204 such that one of the magnetic heads records the blocks of which m+n is an even number and the other magnetic head records the blocks of which m+n is an odd number. However, it is also possible to structure the channel distribution period so that the allocation relationship of the even and odd blocks is reversed for each field detection signal.

We claim:

1. A digital picture encoding apparatus for encoding a picture signal, said apparatus comprising:

digital data compressing means for dividing a picture signal into blocks and for generating compressed picture data corresponding to said picture signal blocks, including orthogonal transformer means for generating frequency components of picture signal blocks of said picture signal, and variable-length encoding means for encoding said frequency components to provide variable-length compressed picture data; and error correction encoding means for (a) arranging compressed picture data from said digital data compressing means into two-dimensional arrays of error correction code blocks, each block including (1) compressed picture data having M word columns and L word rows, where M and L are integers, (2) an inner check code for each word row, and (3) an outer check code for each word column, and for (b) providing inner codes each composed of (1) a row of said compressed picture data arranged into said two-dimensional error correction code blocks, (2) said inner check code, (3) a synchronizing code at each head of a row of said error correction code blocks, and (4) an inner header code of information indicating a relationship between data of the main part of said inner code and a display position of said data on a display screen;

wherein the M words forming a row of said two-dimensional array of error correction code blocks have a data length equal to or larger than a mean code length of said variable-length compressed picture data in at least one of said picture signal blocks.

2. A digital picture encoding apparatus for a picture signal according to claim 1, wherein said digital data compressing means further includes fixed-length encoding means for encoding a DC component of said picture signal obtained from said orthogonal transformer means and for sending fixed-length coded data to said error correction encoding means, and said error correction encoding means includes means for applying said fixed-length coded data to a fixed data area of said inner code.

3. A digital picture encoding apparatus for a picture signal, said apparatus comprising:

digital data compressing means for dividing a picture signal into blocks and for generating compressed picture data corresponding to said picture signal blocks, including orthogonal transformer means for generating frequency components of picture signal blocks of said picture signal, and variable-length encoding means for encoding said frequency components to provide variable-length compressed picture data; and error correction encoding means for (a) arranging compressed picture data from said digital data compressing means into two-dimensional arrays of error blocks, each code block having M word columns and L word rows, where M and L are integers, each block including (1) compressed picture data, (2) an inner check code for each word row, and (3) an outer check code for each word column, and for (b) providing inner codes each composed of (1) a row of said compressed picture data arranged into said two-dimensional error correction code blocks, (2) said inner check code, (3) a synchronizing code at each head of a row of said error correction code blocks, and (4) an inner header code of information indicating a relationship between data of the main part of said inner code and a display position of said data on a display screen;

wherein:

the M words forming a row of said two-dimensional array of error correction code blocks have a data length equal to or larger than a mean code length of said variable-length compressed picture data in at least one of said picture signal blocks, said digital data compressing means further includes fixed-length encoding means for encoding a DC component of the picture signal, and means for dividing said compressed picture data into first data, composed of fixed-length coded data encoded by said fixed-length encoding means and variable-length coded data representing lower frequency components, and second data composed of variable-length coded data representing higher frequency components, and said error correction encoding means includes means for inserting said first data of each block into one of said inner codes, so that the beginning of said first data coincides with a predetermined position in said inner code.

4. A digital picture encoding apparatus for a picture signal according to claim 3, further comprising linkage address generating means for generating a linkage address for indicating a boundary between compressed picture data of a block and that of another block in said inner code, and wherein said error correction encoding means includes means for inserting said linkage address into a certain position of said inner code.

5. A digital picture encoding apparatus for a picture signal according to claim 4, wherein said error correction encoding means further includes means for providing outer header information at least indicating a relationship between said second data and its display position.

6. A digital picture encoding/decoding apparatus for compressed picture data, said apparatus comprising:

an encoding section including:

(a) digital data compressing means for dividing a picture signal into blocks and for generating compressed picture data corresponding to said picture signal blocks, including orthogonal transformer means for generating said compressed picture data by generating frequency components of said picture signal blocks, and variable-length encoding means for encoding said frequency components; and (b) error correction encoding means for (1) arranging said compressed picture data into two-dimensional arrays of error correction code blocks, each code block including compressed picture data having M word columns and L word rows, where M and L are integers, (2) providing an inner check code to each word row and an outer check code to each word column of said error correction code blocks, and (3) structuring inner codes each composed of (i) a row of said compressed picture data arranged into said two-dimensional error correction code blocks, (ii) said inner check code, (iii) a synchronizing code at each head of a row of said error correction code blocks, and (iv) an inner header code of information indicating a relationship between data of the main part of said inner code and a display position of said data on a display screen;

wherein the M words forming a row of said two-dimensional array of error correction code blocks have a data length equal to or larger than a mean code length of said variable-length compressed picture data in at least one of said picture signal blocks; and a decoding section including:

(a) error correction decoding means for correcting errors in compressed picture data received by said decoding means after compression by said digital data compressing means, by utilizing an inner check code and an outer check code, provided by said error correction encoding means and included in said received compressed picture data; and (b) digital data expanding means for expanding compressed picture data outputted from said error correction decoding means, including variable-length decoding means for decoding said compressed picture data into frequency components, and orthogonal inverse transformer means for generating a picture signal from said frequency components;

said error correction decoding means including changeover means for selectively outputting either data resulting from error correction by way of said inner check code and outer check code or a signal resulting from error correction by way of only said inner check code.

7. A digital picture encoding/decoding apparatus for compressed picture data, said apparatus comprising:

an encoding section including:

(a) digital data compressing means for dividing a picture signal into blocks and for generating compressed picture data corresponding to said picture signal blocks, including orthogonal transformer means for generating said compressed picture data by generating frequency components of said picture signal blocks, and variable-length encoding means for encoding said frequency components; and (b) error correction encoding means for (1) arranging said compressed picture data into two-dimensional arrays of error correction code blocks, each code block having M word columns and L word rows, where M and L are integers, (2) providing an inner check code to each word row and an outer check code to each word column of said error correction code blocks, and (3) structuring inner codes each composed of (i) a row of said compressed picture data arranged into said two-dimensional error correction code blocks, (ii) said inner check code, (iii) a synchronizing code at each head of a row of said error correction code blocks, and (iv) an inner header code of information indicating a relationship between data of the main part of said inner code and a display position of said data on a display screen, wherein:

the M words forming a row of said two-dimensional array of error correction code blocks have a data length equal to or larger than a mean code length of said variable-length compressed picture data in at least one of said picture signal blocks, said digital data compressing means further includes fixed-length encoding means for encoding a DC component of said picture signal obtained from said orthogonal transformer means, and for sending fixed-length coded data to said error correction encoding means, and said error correction encoding means includes means for applying said fixed-length coded data to a fixed data area of said inner code; and a decoding section including:
- (a) error correction decoding means for correcting errors in compressed picture data received by said decoding means after compression by said digital data compressing means, by utilizing an inner check code and an outer check code, provided by said error correction encoding means and included in said received compressed picture data; and
- (b) digital data expanding means for expanding compressed picture data outputted from said error correction decoding means, including variable-length decoding means for decoding said compressed picture data into frequency components, and orthogonal inverse transformer means for generating a picture signal from said frequency components, wherein:

said error correction decoding means including changeover means for selectively outputting either data resulting from error correction by way of said inner check code and outer check code or a signal resulting from error correction by way of only said inner check code, and said digital data expanding means further includes fixed-length decoding means for decoding fixed-length coded data received by said error correction decoding means.

8. A digital picture encoding/decoding apparatus for compressed picture data, said apparatus comprising:

an encoding section including:
- (a) digital data compressing means for dividing a picture signal into blocks and for generating compressed picture data corresponding to said picture signal blocks, including orthogonal transformer means for generating said compressed picture data by generating frequency components of said picture signal blocks, and variable-length encoding means for encoding said frequency components; and
- (b) error correction encoding means for (1) arranging said compressed picture data into two-dimensional arrays of error correction code blocks, each code block having M word columns and L word rows, where M and L are integers, (2) providing an inner check code to each word row and an outer check code to each word column of said error correction code blocks, and (3) structuring inner codes each composed of (i) a row of said compressed picture data arranged into said two-dimensional error correction code blocks, (ii) said inner check code, (iii) a synchronizing code at each head of a row of said error correction code blocks, and (iv) an inner header code of information indicating a relationship between data of the main part of said inner code and a display position of said data on a display screen, wherein:

the M words forming a row of said two-dimensional array of error correction code blocks have a data length equal to or larger than a mean code length of said variable-length compressed picture data in at least one of said picture signal blocks, said digital data compressing means further includes fixed-length encoding means for encoding a DC component of the picture signal, and means for dividing said compressed picture data into first data, composed of fixed-length coded data encoded by said fixed-length encoding means and variable-length coded data representing lower frequency components, and second data, composed of variable-length coded data representing higher frequency components, and said error correction encoding means includes means for inserting said first data of each block into one of said inner codes, with the beginning of said first data coinciding with a predetermined position in said inner code; and a decoding section including:
- (a) error correction decoding means for correcting errors in compressed picture data received by said decoding means after compression by said digital data compressing means, by utilizing an inner check code and an outer check code, provided by said error correction encoding means and included in said received compressed picture data; and
- (b) digital data expanding means for expanding compressed picture data outputted from said error correction decoding means, including variable-length decoding means for decoding said compressed picture data into frequency components, and orthogonal inverse transformer means for generating a picture signal from said frequency components, wherein:

said error correction decoding means including changeover means for selectively outputting either data resulting from error correction by way of said inner check code and outer check code or a signal resulting from error correction by way of only said inner check code, and said digital data expanding means further includes combiner means responsive to said first and second data from said error correction decoding means for synthesizing said first data and said second data into one compressed picture data signal composed of full range frequency components.

9. A digital picture encoding/decoding apparatus according to claim 8, wherein:

said error correction encoding means further includes linkage address generating means for generating a linkage address indicating a boundary between compressed picture data of a block and that of another block in said inner code;

said error correction encoding means includes means for inserting said linkage address into a certain position of said inner code; and said digital data expanding means further includes linkage address detecting means responsive to compressed picture data from said error correction decoding means for detecting a linkage address, and combiner means for regenerating said compressed picture data using said linkage address and outputting regenerated data to said variable-length decoding means.

* * * * *